United States Patent
Tubic et al.

(10) Patent No.: US 7,487,063 B2
(45) Date of Patent: Feb. 3, 2009

(54) THREE-DIMENSIONAL MODELING FROM ARBITRARY THREE-DIMENSIONAL CURVES

(75) Inventors: Dragan Tubic, Québec (CA); Patrick Hébert, Sainte-Foy (CA); Denis Laurendeau, Cap-Rouge (CA)

(73) Assignee: Université Laval, Québec, QC (CA)

( * ) Notice: Subject to any disclaimer, the term of this patent is extended or adjusted under 35 U.S.C. 154(b) by 49 days.

(21) Appl. No.: 10/560,130

(22) PCT Filed: Jun. 11, 2004

(86) PCT No.: PCT/CA2004/000864

§ 371 (c)(1),
(2), (4) Date: Nov. 7, 2006

(87) PCT Pub. No.: WO2004/111927

PCT Pub. Date: Dec. 23, 2004

(65) Prior Publication Data

US 2007/0052974 A1 Mar. 8, 2007

Related U.S. Application Data

(60) Provisional application No. 60/477,933, filed on Jun. 13, 2003.

(51) Int. Cl.
*G01B 11/30* (2006.01)
(52) U.S. Cl. .................. 702/152; 702/153; 382/285; 382/293; 382/295; 345/418; 345/419; 345/420
(58) Field of Classification Search ......... 702/150–153; 382/285, 293, 295; 345/418, 419, 420
See application file for complete search history.

(56) References Cited

U.S. PATENT DOCUMENTS

| | | | |
|---|---|---|---|
| 5,850,289 A | | 12/1998 | Fowler et al. |
| 5,946,645 A | * | 8/1999 | Rioux et al. ............... 702/155 |
| 5,963,664 A | | 10/1999 | Kumar et al. |
| 6,081,269 A | | 6/2000 | Quarendon |
| 6,542,249 B1 | | 4/2003 | Kofman et al. |

(Continued)

OTHER PUBLICATIONS

Rusinkiewicz, S., Levoy, M., *Efficient variants of the ICP algorithm*, 2001, Stanford University, International Conference on 3D Digital Imaging and Modeling (3DIM). http://www.cs.princeton.edu/~smr/papers/fasticp/fasticp_paper.pdf.

(Continued)

*Primary Examiner*—Tung S Lau
*Assistant Examiner*—Hien X Vo
(74) *Attorney, Agent, or Firm*—Ogilvy Renault, LLP

(57) ABSTRACT

The present invention relates to a method and a system for creating three-dimensional models of objects from sets of arbitrary three-dimensional entities obtained from target surfaces. It also provides an efficient method for individually refining the alignment of curves to improve the accuracy of the surface model with a linear complexity with respect to the number of curves. The principle behind the invention is that a set of three-dimensional entities, at their approximate positions, creates a field from which the surface can be extracted. The field is constructed in a manner such that the three-dimensional entities are attracted toward the extracted surface. This attraction is used to accurately register each three-dimensional entity with respect to extracted surface. Through iterations, both the field and the entity positions are refined.

20 Claims, 15 Drawing Sheets

U.S. PATENT DOCUMENTS 6,591,004 B1 * 7/2003 VanEssen et al. ............ 382/154
2003/0052875 A1 3/2003 Salomie

OTHER PUBLICATIONS

Kanaya, I., Chihara, K., *A fast algorithm of iterative closest point method*, 2002, 97-102 p., Proceedings of 19th Sensor Symposium, The Institute of Electrical Engineers of Japan. http://www-sens.sys.es.osaka-u.ac.jp/users/kanaya/publication/2002/kanaya-naist-sensor---2002/kanaya-naist-sensor-arti.pdf.

Sagawa, R. et al., *Iterative refinement of range images with anisotropic error distribution*, Jan. 2002, 79-85 p., Proc. of 2002 IEEE/RSJ International Conference on Intelligent Robots and Systems. http://www.cvl.iis.u-tokyo.ac.jp/papers/all/0049.pdf.

Beraldin, J.-A. et al., *Portable digital 3-D imaging system for remote sites*, May 31-Jun. 3, 1998, 326-333 p., published in Proceeding of the 1998 IEEE International Symposium on Circuit and Systems, Monterey, CA, USA.

Hebert, P., *A shelf-referenced hand-held range sensor*, May 2001, 5-12 p., published in proceeding of the IEEE International Conference on Recent Advances in 3-D Digital Imaging and Modeling, Québec.

Blais, F., *A Review of 20 Years of Ranges Sensor Development*, 2003, 62-76 p., SPIE vol. 5013, published in, Videometrics VII, in Proceedings of SPIE-IS&T Electronic Imaging, NRC 44965.

Rioux, M., *Digital 3-D Imaging, theory and applications*, 1994, 2-15 p., SPIE vol. 2350, published in in Proceedings of Videometrics III.

Hebert, P. et al., *Toward a hand-held laser range scanner: integrating observation-based motion compensation*, Jan. 1998, 2-13 p., vol. 3313, published in Proceedings of SPIE.

Hoppe, H. et al., *Surface Reconstruction from Unorganized Points*, Jul. 1992, 71-78 p., vol. 26, published in SIGGRAPH'92 Proceedings, Computer Graphics USA, XP000972231.

Curless, B. et al., *A Volumetric Method for Building Complex Models from Range Images*, 1996, 303-312 p., published in SIGGRAPH'96 Proceedings.

Hilton, A. et al., *Geometric Fusion for a Hand-Held 3D Sensor*, 2000, 12: 44-51 p., published in Machine Vision and Applications.

Masuda, T., *Registration and Integration of Multiple Range Images by Matching Signed Distance Fields for Object Shape Modeling*, 2002, 51-65 p., vol. 87, published in Computer Vision and Image Understanding Academic Press, USA, XP002304316.

Tubic, D. et al., *A volumetric approach for interactive 3D modeling*, 2002, 150-158 p., Proceedings First International Symposium on 3D Data Processing Visualization and Transmission IEEE Comput. Soc Los Alamitos, CA, USA, XP002304315.

Tubic, D. et al., *3D surface modeling from range curves*, 2003, I-842 p., vol. 1, Proceedings 2003 IEEE Computer Society Conference on Computer Vision and Pattern Recognition IEEE Comput. Soc Los Alamitos, CA, USA, XP002304317.

Tubic, D. et al., *Efficient surface reconstruction from range curves*, 2003.

Tubic, D. et al., *3D Surface Modeling from Curves*, Dec. 18, 2002.

Mendonça, Paulo R. S. et al., 1999, *Estimation of Epipolar Geometry from Apparent Contours: Affine and Circular Motion Cases*, 9-14 p., vol. 1, Proceedings, 1999 IEEE Computer Society Conference on Computer Vision and Pattern Recognition (Cat. No. PR00149) IEEE Comput. Soc Los Alamitos, CA, USA, XP010347634.

\* cited by examiner

THREE-DIMENSIONAL MODELING FROM ARBITRARY THREE-DIMENSIONAL CURVES

CROSS-REFERENCES TO RELATED APPLICATIONS

This application is a national phase entry of PCT patent application no. PCT/CA2004/000864 filed on Jun. 11, 2004 by Applicants, which claims priority of U.S. provisional patent application No. 60/477,933 filed Jun. 13, 2003 by Applicants, the specifications of which are hereby incorporated by reference.

BACKGROUND OF THE INVENTION

1. Field of the Invention

This invention relates to the field of three-dimensional imaging systems, and more particularly to a method and apparatus for creating three-dimensional models of objects from sets of arbitrary three-dimensional curves obtained from a target surface.

2. Description of Prior Art

Three-dimensional digitization and modeling systems are commonly used in many industries and their applications are numerous. A few examples of such applications are: inspection and measurement of shape conformity in industrial production systems, digitization of clay models for industrial design and styling applications, reverse engineering of existing parts, interactive visualization of objects in multimedia applications, and three-dimensional documentation of artwork and artifacts.

The shape of an object is digitized using a ranging sensor that measures the distance between the sensor and a set of points on the surface. From these measurements, three-dimensional coordinates of points on the target surface are obtained in the sensor reference frame. Prom a given point of view, the ranging sensor can only acquire distance measurements on the visible portion of the surface. To digitize the whole object, the sensor must therefore be moved to a plurality of viewpoints in order to acquire sets of range measurements that cover the entire surface. A model of the object is built by merging and registering the sets of range measurements in a common reference frame. Creating the three-dimensional model of an object is a multistep process usually comprising: (a) acquiring sets of range measurements from a plurality of viewpoints, (b) roughly aligning the sets of range measurements in a common reference frame, (c) refining the registration of the sets of range measurements in the common reference frame, (d) merging the range measurements in a unique non-redundant model, and (e) building a model of the surface using geometric primitives such as triangles.

Three types of ranging sensors are commonly used to digitize the surface of an object: (a) cloud of points sensors which provide unorganized sets of range measurements, (b) range image sensors which provide sets of measurements organized into regular matrices, and (c) curve sensors which provide range measurements organized into sets of three-dimensional curves, e.g. profiles. Cloud of points and range image sensors offer the advantage of providing a high density of measurements from a single viewpoint. They are however bulky and cumbersome to move from one viewpoint to the next. Due to their greater simplicity and robustness, curve sensors are usually favored for digitizing the entire shape of objects. These sensors can be easily moved from one viewpoint to the next, by either a mechanical system or simply an operator holding the sensor in hand.

Numerous examples of ranging sensor devices are described in the art. "Portable digital 3-d imaging system for remote sites" by J.-A. Beraldin et al., published in proceedings of the 1998 IEEE International Symposium on Circuit and Systems, Monterey, Calif., USA: 326-333. May 31-Jun. 3, 1998, describes a compact laser stripe range sensor that can be mounted, for instance on a translational or rotational stage. "A Self-Referenced Hand-Held Range Sensor" by P. Hebert, published in Proceedings of the IEEE International Conference on Recent Advances in 3-D Digital Imaging and Modeling, Quebec, pp. 5-12, May 2001, presents a hand-held range sensor gathering a set of curves issued from a crosshair laser projection pattern. In "A Review of 20 Years of Ranges Sensor Development" by F. Blais, published in, Videometrics VII, in Proceedings of SPIE-IS&T Electronic Imaging, SPIE Volume 5013 (2003), pp 62-76, NRC 44965, several range sensors are described, among these a range scanner collecting both 3-D measurements and color (R,G,B) properties is further described in "Digital 3-D Imaging, theory and applications" by M. Rioux, published in Proceedings of Videometrics III, SPIE vol. 2350, pp. 2-15, 1994.

Using curve sensors with current three-dimensional modeling systems requires that the sensor be moved in an organized and regular motion perpendicular to the direction of the measured profile. This, to simulate a range image that can be processed in the same way the output of a range image sensor would be. Since the range of motion is restricted to a single axis, the operation must be repeated multiple times to simulate the acquisition of range images from multiple viewpoints. In addition to imposing a regular unidirectional motion of the sensor, the main drawback with current systems that process data in this manner is that the alignment error of each curve cannot be individually corrected. As the set of curves acquired in a given motion sequence is processed as a rigid range image, only the global alignment error of the entire set of curves can be corrected by the modeling system, thus limiting the accuracy of the reconstructed surface.

No method has been developed in the art for creating a surface model from arbitrary three-dimensional curves. U.S. Pat. No. 5,946,645 issued Aug. 31, 1999 to Marc Rioux and Patrick Hebert describes a method for individually refining the alignment of arbitrary three-dimensional profiles. The method claimed relies on measuring the distance between each profile and every other profile in the set. Because of this combinatorial complexity, the method cannot currently be used in practice with the high number of curves typically needed to model an entire object. Furthermore, this patent does not describe any means for creating a model of the surface from the three-dimensional curves once their alignment has been refined. The use of this curve registration method on data acquired from a hand-held sensor is described in "Toward a hand-held laser range scanner: integrating observation-based motion compensation" by P. Hebert et al., published in Proceedings of SPIES, volume 3313, pages 2-13, January 1998.

A volumetric method for reconstructing surface models from unorganized clouds of three-dimensional points is described in "Surface Reconstruction from Unorganized Points" by H. Hoppe et al., published in SIGGRAPH '92 Proceedings, volume 26, pages 71-78, July 1992. The volumetric representation used by this method only contains the distance to the surface, which is sufficient to reconstruct the surface but does not contain enough information to refine alignment errors of data sets. This method is general and can be used to create a surface model for a set of arbitrary three-dimensional curves by converting it into an unorganized cloud of points. This process is difficult to implement in practice because it requires that the entire target surface be measured with a high and relatively uniform density. Doing so also eliminates the rigid arrangement of each curve in the set. This loss of information negatively impacts the quality and accuracy of the reconstructed surface because it becomes impossible to correct the alignment of curves. No method for refining the alignment of the three-dimensional data is described. A specialization of this surface reconstruction method for merging range images is described in "A Volumetric Method for Building Complex Models from Range Images" by B. Curless et al., published in SIGGRAPH '96, Proceedings, pages 303-312, 1996. This is a volumetric method that reconstructs the surface incrementally by adding range images to the model. The method exploits the structure of the images and cannot be used with arbitrary three-dimensional curves. As with the more general approach described by Hoppe, no method for refining the alignment of the three-dimensional data is described.

A method for reconstructing a surface from data acquired with a hand-held curve sensor is described in "Geometric Fusion for a Hand-Held 3D Sensor" by A. Hilton et al., published in Machine Vsion and Applications, 12:44-51, 2000. This method requires that the sensor is moved in a regular and organized motion in such a way to provide parallel curves that are merged into range images. Instead of directly using the three-dimensional curves to build the surface, this method must combine the curves into simulated range images. The main drawback of the method is that it poses severe constraints on the range of motion of the sensor. Also, since the curves are merged into images, the alignment error of each curve cannot be individually corrected.

"Registration and Integration of Multiple Range Images by Matching Signed Distance Fields for Object Shape Modeling" by T. Masuda published in Computer Vision and Image Understanding 87, pages 51-65, 2002 describes a volumetric method for surface reconstruction and alignment refinement based on signed distance fields. This method is however specific to range images and cannot be generalized to arbitrary three-dimensional curves because signed distance fields cannot be constructed from single curves.

There therefore exists a need for new methods for creating three-dimensional models of objects from sets of arbitrary three-dimensional entities obtained from a target surface and eliminating the need for moving the sensor in organized and regular motions to simulate the creation of range images.

SUMMARY OF THE INVENTION

It is an object of the present invention to overcome the problems mentioned previously.

In a preferred embodiment, the present invention provides a method for ascertaining the three-dimensional shape of a target surface using a hand-held ranging sensor to obtain a plurality of arbitrary overlapping profiles.

The present invention relates to a method for creating three-dimensional models of objects from sets of arbitrary three-dimensional entities obtained from target surfaces. It also provides an efficient method for individually refining the alignment of curves to improve the accuracy of the surface model with a linear complexity with respect to the number of curves. The principle behind the invention is that a set of three-dimensional entities, at their approximate positions, creates a field from which the surface can be extracted. The field is constructed in a manner such that the three-dimensional entities are attracted toward the extracted surface. This attraction is used to accurately register each three-dimensional entity with respect to extracted surface. Through iterations, both the field and the entity positions are refined.

According to one broad aspect of the present invention, there is provided a method for reconstructing surfaces from a single or a plurality of arbitrary three-dimensional entities obtained from a target surface. The method comprises: obtaining a set of at least one three-dimensional entity, each entity being a set of three-dimensional points, each three-dimensional point containing at least the three-dimensional coordinate of the point on the target surface; constructing a volumetric implicit representation of the target surface in the form of a vector field, each vector in the vector field containing at least the distance to the reconstructed surface and the direction toward the reconstructed surface; placing each three-dimensional entity in the vector field and updating the vector field accordingly; and Reconstructing the target surface from the information contained in the vector field.

Preferably, at least one of the three-dimensional entities is an organized set of three-dimensional points that are part of one or a plurality of three-dimensional curves.

According to another broad aspect of the present invention, there is provided a method for refining the alignment of arbitrary three-dimensional entities obtained from a target surface. The method comprises:

(a) obtaining a set of at least two three-dimensional entities, each entity being a set of three-dimensional points, each three-dimensional point containing at least the three-dimensional coordinate of the point on the target surface;

(b) constructing a volumetric implicit representation of the target surface in the form of a vector field, each vector in the vector field containing at least the distance to the reconstructed surface and the direction toward the reconstructed surface;

(c) placing at least two three-dimensional entities in the vector field and updating the vector field accordingly;

(d) selecting at least one three-dimensional entity placed in the vector field and obtaining a subset of three-dimensional points on each of the selected three-dimensional entities, three-dimensional points in these subsets being called control points;

(e) for each control point in each selected three-dimensional entity, computing a contribution to a cost function, this contribution being a function of at least the vector field and the three-dimensional coordinate of the control point;

(f) for each selected three-dimensional entity, computing a new position that optimizes its corresponding cost function; and (g) placing each selected three-dimensional entity in the vector field at its newly computed position and updating the vector field accordingly.

According to a further aspect of the present invention, the steps (c) and (d) of the previous method can be modified for:

(c) placing at least one three-dimensional entity in the vector field and updating the vector field accordingly;

(d) selecting at least one of the three-dimensional entities not yet placed in the vector field, placing the selected three-dimensional entities in the vector field without updating the field and obtaining a subset of three-dimensional points on each of the selected entities, three-dimensional points in these subsets being called control points.

According to still another broad aspect of the present invention, there is provided a method for ascertaining the three-dimensional shape of a target surface. The method comprises using a ranging sensor to produce a set of three-dimensional entities, a method according to present invention to reconstruct the target surface, and a method according to the present invention to improve the quality and accuracy of the reconstructed surface.

According to another broad aspect of the present invention, there is provided a system for reconstructing surfaces from a single or a plurality of arbitrary three-dimensional entities obtained from a target surface comprising: a three-dimensional entity provider for obtaining a set of at least one three-dimensional entity, each entity being a set of three-dimensional points, each three-dimensional point containing at least the three-dimensional coordinates of the point on the target surface; an implicit representation constructor for constructing a volumetric implicit representation of the target surface in the form of a vector field, each vector in the vector field containing at least the distance to the reconstructed surface and the direction toward the reconstructed surface; for placing each three-dimensional entity in the vector field; and for updating the vector field accordingly; and a target surface reconstructor for reconstructing the target surface from the information contained in the vector field.

According to a further broad aspect of the present invention, there is provided a system for refining an alignment of arbitrary three-dimensional entities obtained from a target surface, comprising: a three-dimensional entity provider for obtaining a set of at least two three-dimensional entity, each entity being a set of three-dimensional points, each three-dimensional point containing at least the three-dimensional coordinates of the point on the target surface; an implicit representation constructor for constructing a volumetric implicit representation of the target surface in the form of a vector field, each vector in the vector field containing at least the distance to the reconstructed surface and the direction toward the reconstructed surface; for placing at least two three-dimensional entity in the vector field; and for updating the vector field accordingly; and a control point selector for selecting at least one three-dimensional entity placed in the vector field and obtaining a subset of three-dimensional points on each of the selected three-dimensional entities, three-dimensional points in these subsets being called control points; a cost function calculator for computing, for each control point in each selected three-dimensional entity, a contribution to a cost function, the contribution being a function of at least the vector field and the three-dimensional coordinate of the control point; a new position calculator for computing, for each selected three-dimensional entity, a new position that optimizes its corresponding cost function; wherein the implicit representation constructor places each selected three-dimensional entity in the vector field at its newly computed position and updates the vector field accordingly.

According to still a further broad aspect of the present invention, there is provided a system for refining an alignment of arbitrary three-dimensional entities obtained from a target surface, comprising: a three-dimensional entity provider for obtaining a set of at least two three-dimensional entity, each entity being a set of three-dimensional points, each three-dimensional point containing at least the three-dimensional coordinates of the point on the target surface; an implicit representation constructor for constructing a volumetric implicit representation of the target surface in the form of a vector field, each vector in the vector field containing at least the distance to the reconstructed surface and the direction toward the reconstructed surface; for placing at least one three-dimensional entity in the vector field; and for updating the vector field accordingly; and a control point selector for selecting at least one of the three-dimensional entities not yet placed in the vector field, wherein the implicit representation constructor places the selected three-dimensional entities in the vector field without updating the field, and obtaining a subset of three-dimensional points on each of the selected three-dimensional entities, three-dimensional points in these subsets being called control points; a cost function calculator for computing, for each control point in each selected three-dimensional entity, a contribution to a cost function, the contribution being a function of at least the vector field and the three-dimensional coordinate of the control point; a new position calculator for computing, for each selected three-dimensional entity, a new position that optimizes its corresponding cost function; wherein the implicit representation constructor places each selected three-dimensional entity in the vector field at its newly computed position and updates the vector field accordingly.

In a preferred embodiment, the invention is used to process three dimensional curves obtained from a hand held sensor such as that described in "A Self-Referenced Hand-Held Range Sensor" by P. Hebert, published in Proceedings of the IEEE International Conference on Recent Advances in 3-D Digital Imaging and Modeling, Quebec, pp. 5-12, May 2001.

According to another broad aspect, there is provided a method for reconstructing a surface from at least one arbitrary three-dimensional entity obtained from a target surface. The method comprises: obtaining a set of at least one three-dimensional entity and a position for the at least one entity in a common three-dimensional coordinate system, each entity being a set of three-dimensional points, each said point containing at least the three-dimensional coordinates of said point on the target surface, wherein the entity is one of an unorganized cloud, a three-dimensional curve and a range image; constructing a volumetric implicit representation of the target surface in the form of a vector field using said set, each vector in the vector field containing at least the distance to the target surface and the direction toward the target surface; and reconstructing the target surface from the information contained in the vector field.

According to another broad aspect, there is provided a method for refining an alignment of arbitrary three-dimensional entities obtained from a target surface. The method comprises:

(a) obtaining a set of at least two three-dimensional entities and a position for the at least two entities in a common three dimensional coordinate system, each entity being a set of three-dimensional points, each said point containing at least the three-dimensional coordinates of said point on the target surface, wherein each entity is one of an unorganized cloud, a three-dimensional curve and a range image;

(b) constructing a volumetric implicit representation of the target surface in the form of a vector field using a subset of at least one entity of said set, each vector in the vector field containing at least the distance to the target surface and the direction toward the target surface;

(c) selecting at least one obtained entity;

(d) obtaining a subset of said points on each of the selected entities, points in these subsets being called control points;

(e) for each control point in each selected entity, computing a contribution to a cost function, the contribution being a function of at least the vector field and the coordinate of the control point;

(f) for each selected entity, computing a new position that optimizes its corresponding cost function; and (g) placing each selected entity in the vector field at its newly computed position and updating the vector field accordingly.

According to another broad aspect, there is provided a system for reconstructing a surface from at least one arbitrary three-dimensional entity obtained from a target surface comprising: a three-dimensional entity provider for obtaining a set of at least one three-dimensional entity and a position for the at least one entity in a common three-dimensional coordinate system, each entity being a set of three-dimensional points, each point containing at least the three-dimensional coordinates of said point on the target surface, wherein the entity is one of an unorganized cloud, a three- dimensional curve and a range image; an implicit representation constructor for constructing a volumetric implicit representation of the target surface in the form of a vector field using said set, each vector in the vector field containing at least the distance to the target surface and the direction toward the target surface; and a target surface reconstructor for reconstructing the target surface from the information contained in the vector field.

According to another broad aspect, there is provided a system for refining an alignment of arbitrary three-dimensional entities obtained from a target surface, comprising: a three-dimensional entity provider for obtaining a set of at least two three-dimensional entities and a position for the at least two entities in a common three-dimensional coordinate system, each entity being a set of three-dimensional points, each point containing at least the three-dimensional coordinates of said point on the target surface, wherein each entity is one of an unorganized cloud, a three-dimensional curve and a range image; an implicit representation constructor for constructing a volumetric implicit representation of the target surface in the form of a vector field using said set, each vector in the vector field containing at least the distance to the target surface and the direction toward the target surface; and a control point selector for selecting at least one entity used in the vector field; a subset provider for obtaining a subset of points on each of the selected entities, points in these subsets being called control points; a cost function calculator for computing, for each control point in each selected entity, a contribution to a cost function, the contribution being a function of at least the vector field and the coordinate of the control point; a new position calculator for computing, for each selected entity, a new position that optimizes its corresponding cost function; wherein the implicit representation constructor places each selected entity in the vector field at its newly computed position and updates the vector field accordingly.

BRIEF DESCRIPTION OF THE DRAWINGS

These and other features, aspects and advantages of the present invention will become better understood with regard to the following description and accompanying drawings wherein.

DESCRIPTION OF PREFERRED EMBODIMENT

The present invention now will be described more fully hereinafter. However, this invention may be embodied in many different forms and should not be construed as limited to the embodiments set forth herein; rather, these embodiments are provided so that this disclosure will be thorough and complete, and will fully convey the scope of the invention to those skilled in the art.

Figure 1:
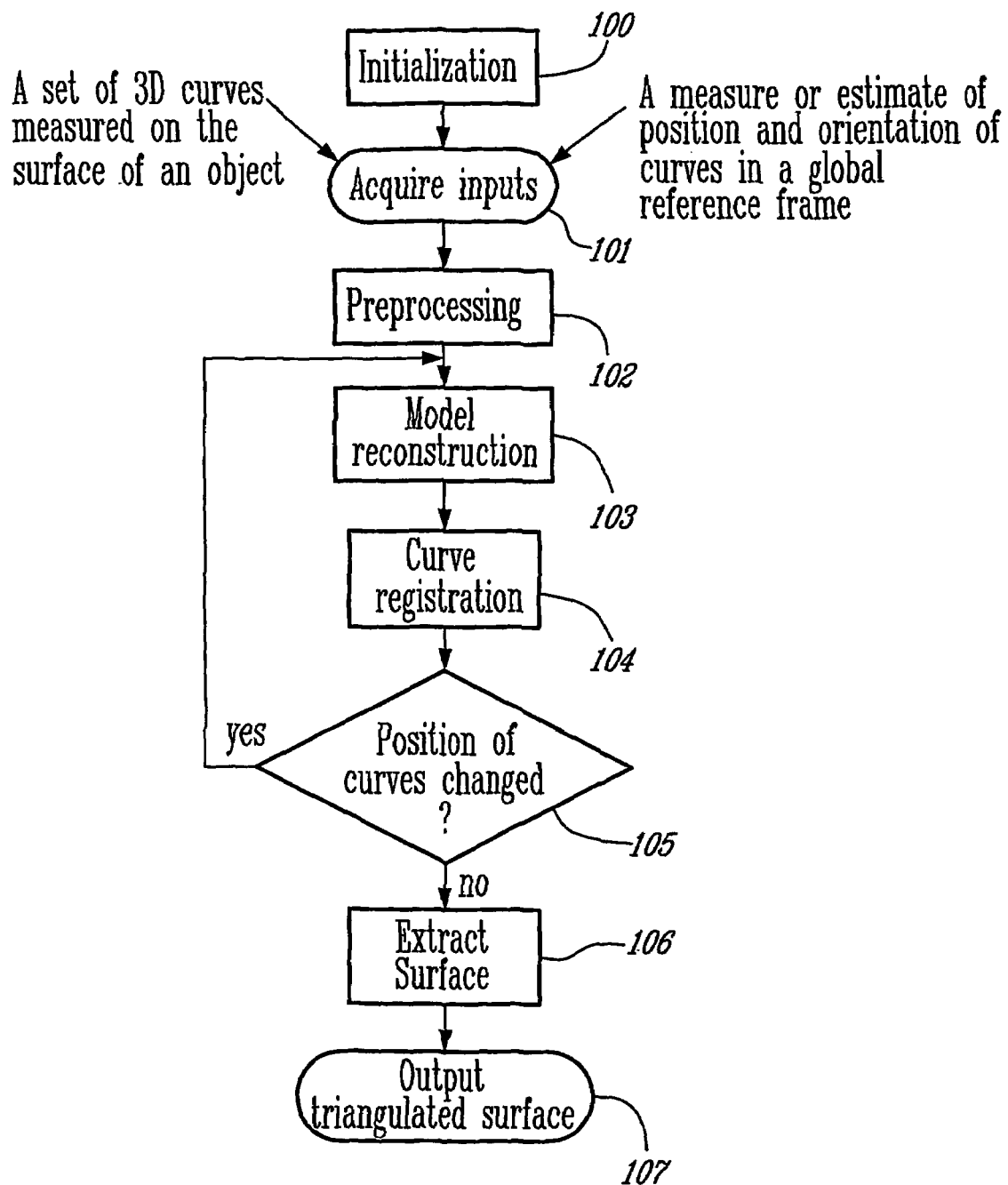
FIG. 1 represents a flowchart describing the method for surface reconstruction from arbitrary three-dimensional curves followed by a registration of three-dimensional curves to the reconstructed surface.

FIG. 1 shows a flowchart describing the functioning of the method for surface reconstruction from arbitrary 3D curves as well as for registration of 3D curves to the reconstructed surface.

Initialisation

Figure 2:
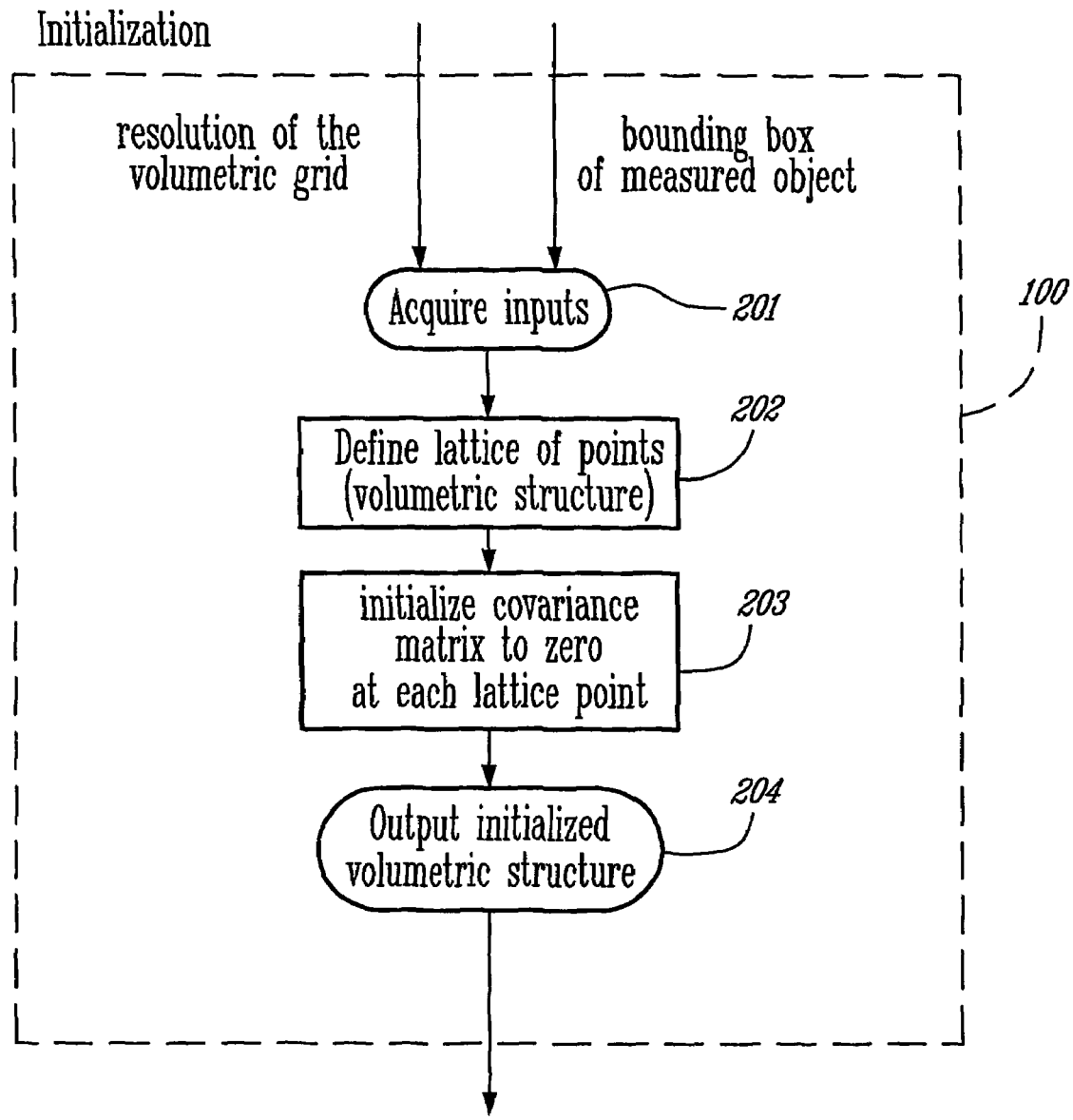
FIG. 2 represents the initialization step.

Initialization step 100, illustrated in FIG. 2, requires two user-supplied parameters: bounding box of the object to be reconstructed and the resolution of the volumetric lattice of points (volumetric structure).

The bounding box is defined as coordinates $b_{min}=[x_{min}, y_{min}, z_{min}]^T$ and $b_{max}=[x_{max}, y_{max}, z_{max}]^T$ of two opposite corners of the box that completely contains the object, such that $x_{min}<x_{max}$, $y_{min}<y_{max}$ and $z_{min}<z_{max}$.

Resolution $\Delta$ of the volumetric structure is defined as the distance between two neighbouring lattice points.

Volumetric lattice V of points is defined 202 as a set V of points (voxels)

$$V = \{[x_i, y_j, z_k]^T \mid x_i = x_{\min} + i\Delta, y_j = y_{\min} + j\Delta, z_k = z_{\min} + k\Delta\},$$

$$i = 0, \ldots, N_x, j = 0, \ldots, N_y, k = 0, \ldots, N_z, \text{ where}$$

$$N_x = \lceil \frac{x_{\max} - x_{\min}}{\Delta} \rceil, N_y = \lceil \frac{y_{\max} - y_{\min}}{\Delta} \rceil \text{ and } N_z = \lceil \frac{z_{\max} - z_{\min}}{\Delta} \rceil.$$

Operator [x] represents smallest integer greater than x.

A 3×3 matrix K (covariance matrix) is attached to each lattice point and all elements of the matrix K are initialized to zero 203. Also, to each lattice point, a vector g (distance vector) is attached as well as a weighting factor $\omega$ both initialized to zero. This volumetric structure represents implicitly the reconstructed surface.

Input Data

Input 101 to the reconstruction and registration algorithm is a set $C=\{C_1, C_2, \ldots, C_N\}$ of 3D curves measured on the surface of an object. A curve $C_i$ is defined as a set of 3D points $C_i = \{p_1, p_2, \ldots, p_{M_i}\}$, $p_k = [x_k \; y_k \; z_k]^T$ such that the real surface curve can be approximated as a set of line segments $\{p_1p_2, p_2p_3, \ldots, p_{M_i-1}p_{M_i}\}$.

Preprocessing

Figure 3:
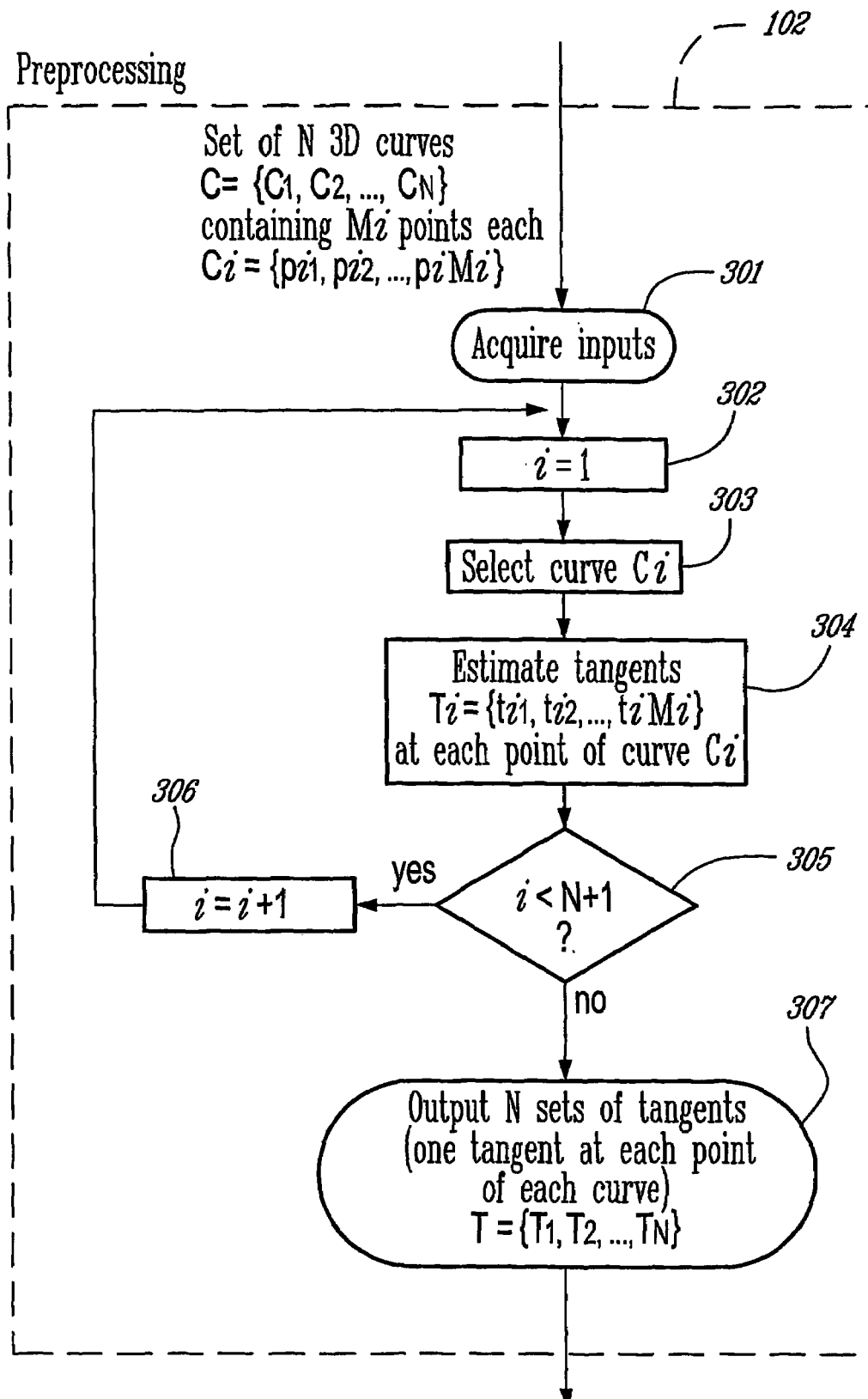
FIG. 3 represents the preprocessing step.

The only preprocessing step 102, FIG. 3, is the estimation of tangents at each point of all curves 304. At a point $p_k$ of curve $C_i = \{p_1, p_2, \ldots, p_{M_i}\}$ the tangent $t_k$ can be estimated as:

$$t_k = \frac{1}{2}\left[\frac{p_k - p_{k-1}}{\|p_k - p_{k-1}\|} + \frac{p_{k+1} - p_k}{\|p_{k+1} - p_k\|}\right]$$

Optionally, the tangents can be filtered by averaging them with tangents at neighbouring points:

$$t_k \leftarrow \frac{1}{3}[t_{k-1} + t_k + t_{k+1}]$$

After the preprocessing step, a set of tangents $T_i = \{t_1, t_2, \ldots, t_{M_i}\}$ is assigned to each curve $C_i$ 307. To distinguish the tangents belonging to different curves, the box 304 specifies $t_{ik}$ as a single tangent, where i is the curve index.

Model Reconstruction

Figure 4:
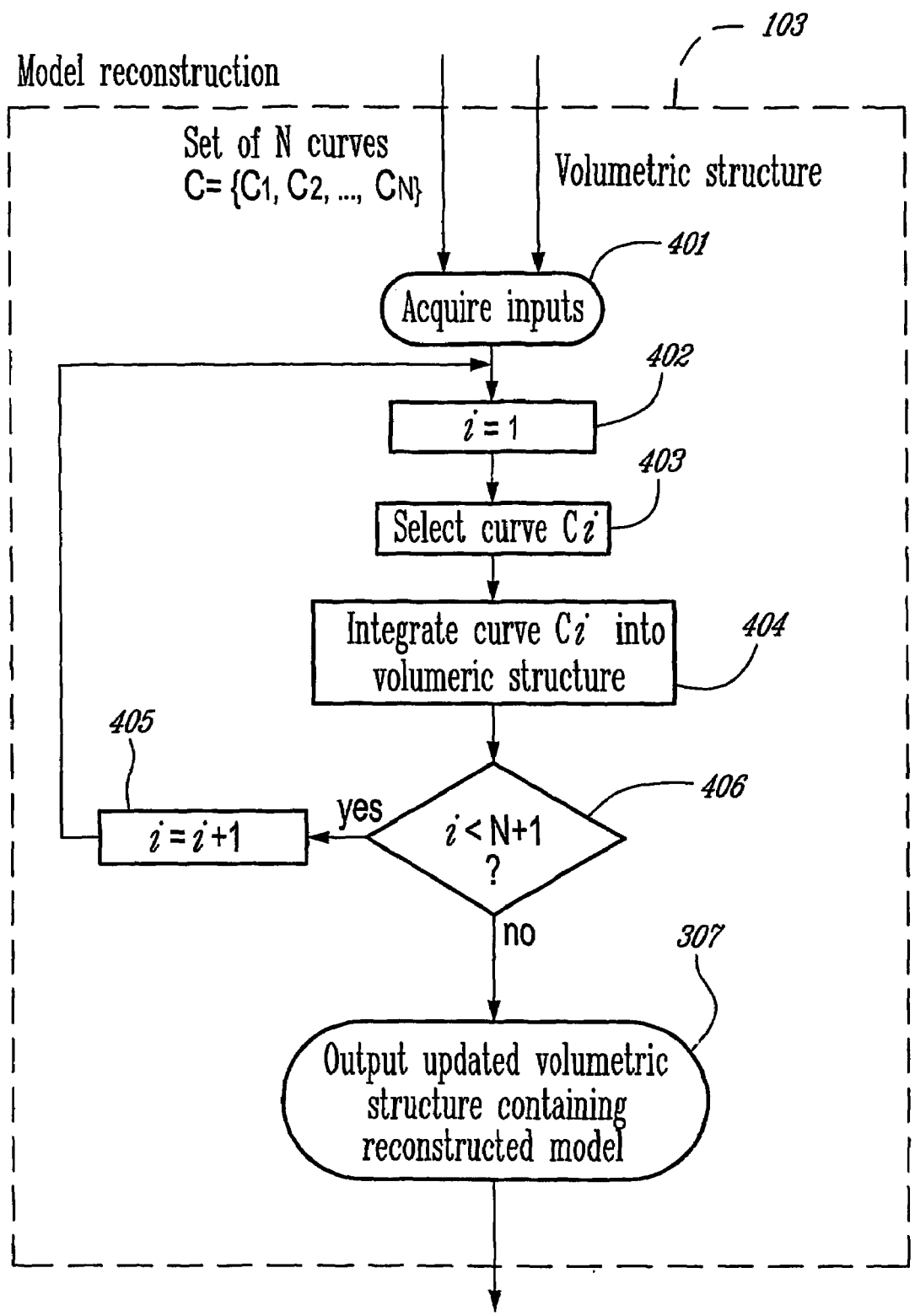
FIG. 4 represents the model reconstruction step.

Model reconstruction 103, FIG. 4, consists of the integration of each curve independently into the volumetric structure 404. The order in which the curves are integrated is not important. The final result is the same regardless the order of the curves.

Integration of a Single Curve into the Volumetric Structure

Figure 5:
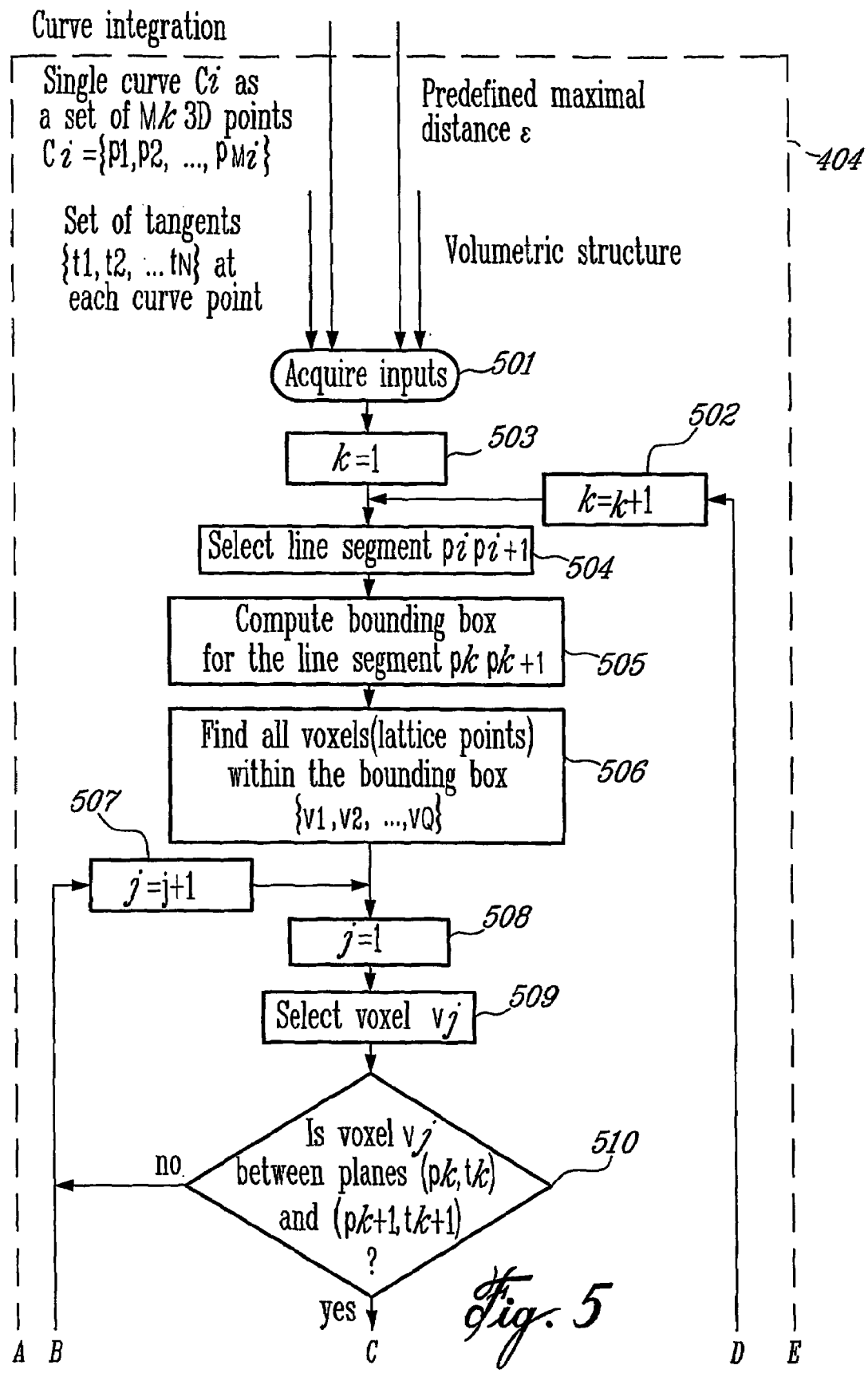
FIG. 5 represents the integration of a single curve into the volumetric structure as a step for model reconstruction.
Figure 5:
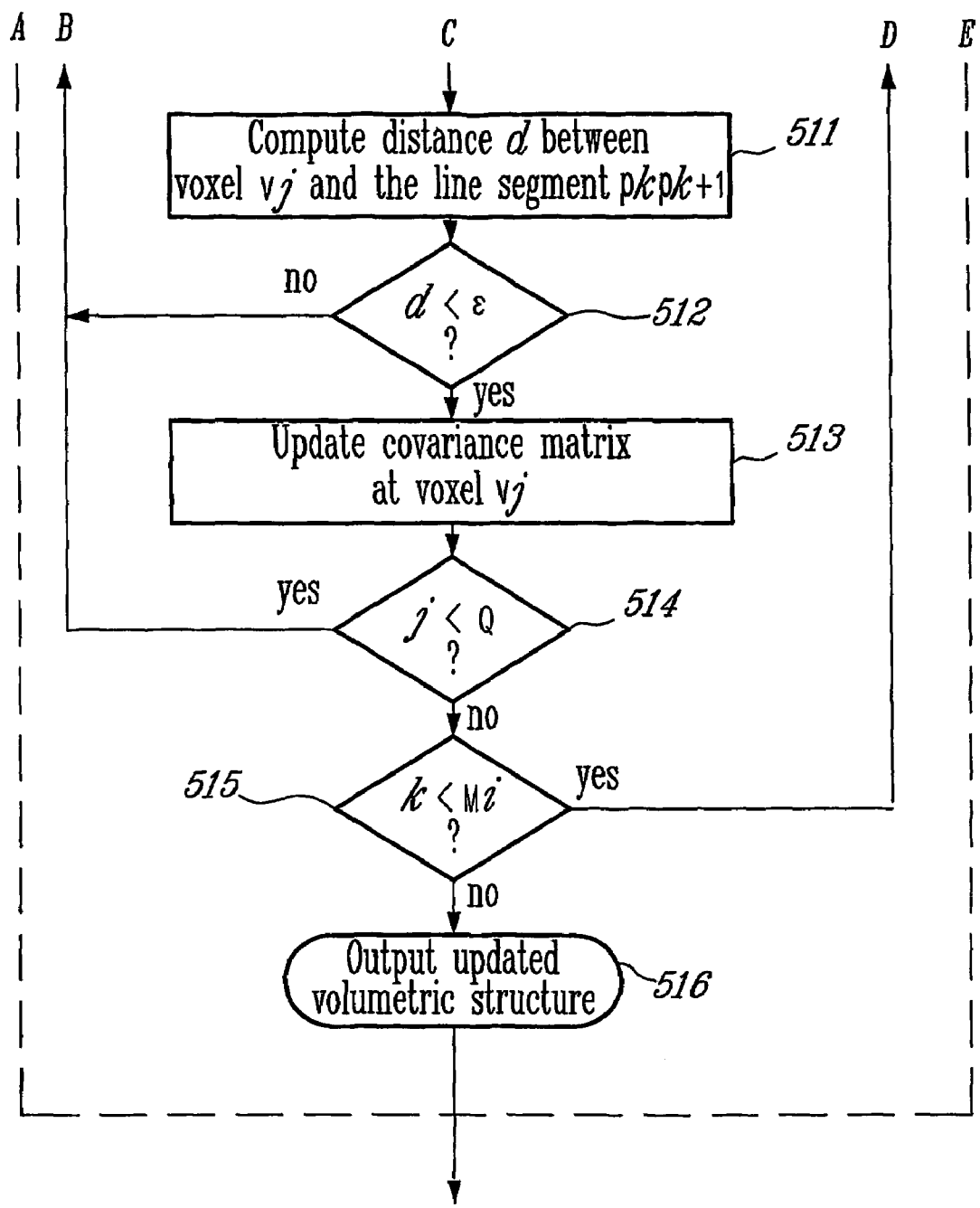

The integration of a single curve into the volumetric structure 404 is depicted as a flowchart diagram in FIG. 5. For the purpose of integration of curves into the volumetric structure, a curve $C_i = \{p_1, p_2, \ldots, p_{M_i}\}$ is considered as a set of line segments $\{p_1p_2, p_2p_3, \ldots, p_{M_i-1}p_{M_i}\}$. A curve is always integrated one line segment at the time 504. In the following, the computation is explained for a single line segment $p_k p_{k+1}$. The same procedure is repeated for all other line-segments contained in the curve 514.

The integration procedure consists in updating the covariance matrices and the distance vectors in the neighbourhood of the line segment. The size of the neighbourhood $\epsilon$ is a user-specified parameter and cannot be smaller then the $\sqrt{3}\Delta$, where $\Delta$ is the resolution of the volumetric structure, as defined above.

The first step of integration 404 is to compute the bounding box B for the line segment. The bounding box is defined as coordinates $b_{min} = [x_{min}, y_{min}, z_{min}]^T$ and $b_{max} = [x_{max}, y_{max}, z_{max}]^T$ of two opposite corners of a rectangular box such that $x_{min} < x_{max}$, $Y_{min} < Y_{max}$ and $Z_{min} < Z_{max}$, where $x_{min} = \min(x_k - \epsilon, x_{k+1} - \epsilon)$, $x_{max} = \max(x_k + \epsilon, x_{k+1} + \epsilon)$ $y_{min} = \min(y_k - \epsilon, y_{k+1} - \epsilon)$, $y_{max} = \max(y_k + \epsilon, y_{k+1} + \epsilon)$ $z_{min} = \min(z_k - \epsilon, z_{k+1} - \epsilon)$, $z_{max} = \max(z_k + \epsilon, z_{k+1} + \epsilon)$ Let L be the set of all lattice points (voxels) within the bounding box B $L = \{v_j \in V | v_j \in B, j = 1, \ldots, Q\}$, where V is the set of lattice points 202. For each voxel $v_j \in L$ it is first verified that the voxel $v_j$ is in-between two planes $\Pi_1$ and $\Pi_2$ defined as planes that contain points $p_k$ and $p_{k+1}$ and whose normals are equal to tangents $t_k$ and $t_{k+1}$ respectively 510. If not, the next voxel is selected 507.

To compute the distance, a line segment $p_k p_{k+1}$ is parameterized as:

$l(u) = p_k + u(p_{k+1} - p_k), 0 \leq u \leq 1$.

The tangents at the two end points are then interpolated as:

$t(u) = t_k + u(t_{k+1} - t_k), 0 \leq u \leq 1$.

The normal n(u) at each point of a line segment is defined as the vector being contained in the plane $p_k p_{k+1} v_j$ and perpendicular to the tangent t(u). The normal n(u) and is also interpolated over the line segment in the same manner:

$n(u) = n_k + u(n_{k+1} - n_k), 0 \leq u \leq 1$.

Normals $n_k$ and $n_{k+1}$ are unit vectors perpendicular to tangents $t_k$ and $t_{k+1}$ respectively and contained in plane $p_k p_{k+1} v_j$.

Figure 6:
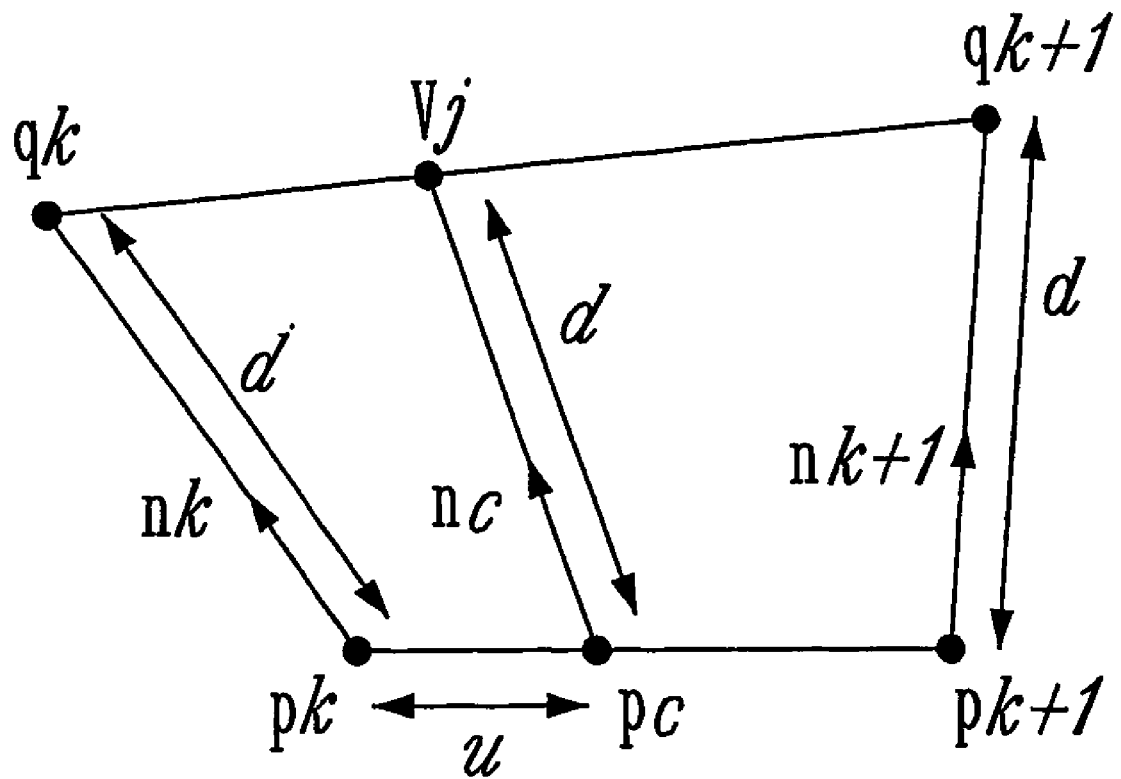
FIG. 6 represents the determination of the distance d between a voxel and a line segment in the integration of a single curve step.

The distance d between voxel $v_j$ and the line segment $p_k p_{k+1}$ is defined as the distance between $v_j$ and the point $p_c$ whose normal $n_c$ passes through $v_j$. This is illustrated in FIG. 6. The distance is computed as the distance for which the area of the triangle $q_k q_{k+1} v_j$ is zero, i.e. that the cross-product of $q_k - v_j$ and $q_{k+1} - v_j$ is zero, where $q_k = d n_k + p_k$, $q_{k+1} = d n_{k+1} + p_{k+1}$.

The distance d is obtained from the equation $a + db + d^2 c = 0$, where $a = (p_k - v_j) \times (p_{k+1} - v_j)$, $b = n_{k+1} \times (p_k v_j) + n_k \times (p_{k+1} - v_j)$, $a + db + d^2 c = 0$.

Preceding equation is a system of three quadric equations with a single unknown d. Any of these equations can be used to compute d after making sure that the chosen parameters a,b,c do not vanish altogether. The chosen equation can have up to two real roots. If the number of roots is zero, the voxel $v_j$ is rejected and next voxel is selected 507. If there are two real roots, the root of interest is the one with the smallest positive value.

Using the distance computed above, parameter $u_c$ is computed as:

$$u_c = \frac{\|q_k - v_j\|}{\|q_{k+1} - q_k\|}.$$

Next, it is verified whether the distance d is smaller then the maximal allowed distance $\epsilon$. If not, next voxel is selected 507.

Finally, the covariance matrix $K_j$ at voxel $v_j$ is updated as follows:

$K_j \leftarrow K_j + t(u_c)t(u_c)^T$

Vector $g_j$ is updated as:

$$g_j \leftarrow g_j + e^{-\frac{d^2}{0.5\Delta}}(v_j - p_c)$$

Weighting value $\omega_j$ is updated as:

$$\omega_j \leftarrow \omega_j + e^{-\frac{d^2}{0.5\Delta}}$$

The whole procedure is repeated for the remaining voxels 514 as well as for the remaining line segments 515.

The resulting volumetric structure contains an implicit representation of the reconstructed surface (reconstructed model). The covariance matrices K, and distance vectors g, represent implicitly a vector field whose value is the direction and the distance toward the closest point on the reconstructed model.

Curve Registration

Figure 7:
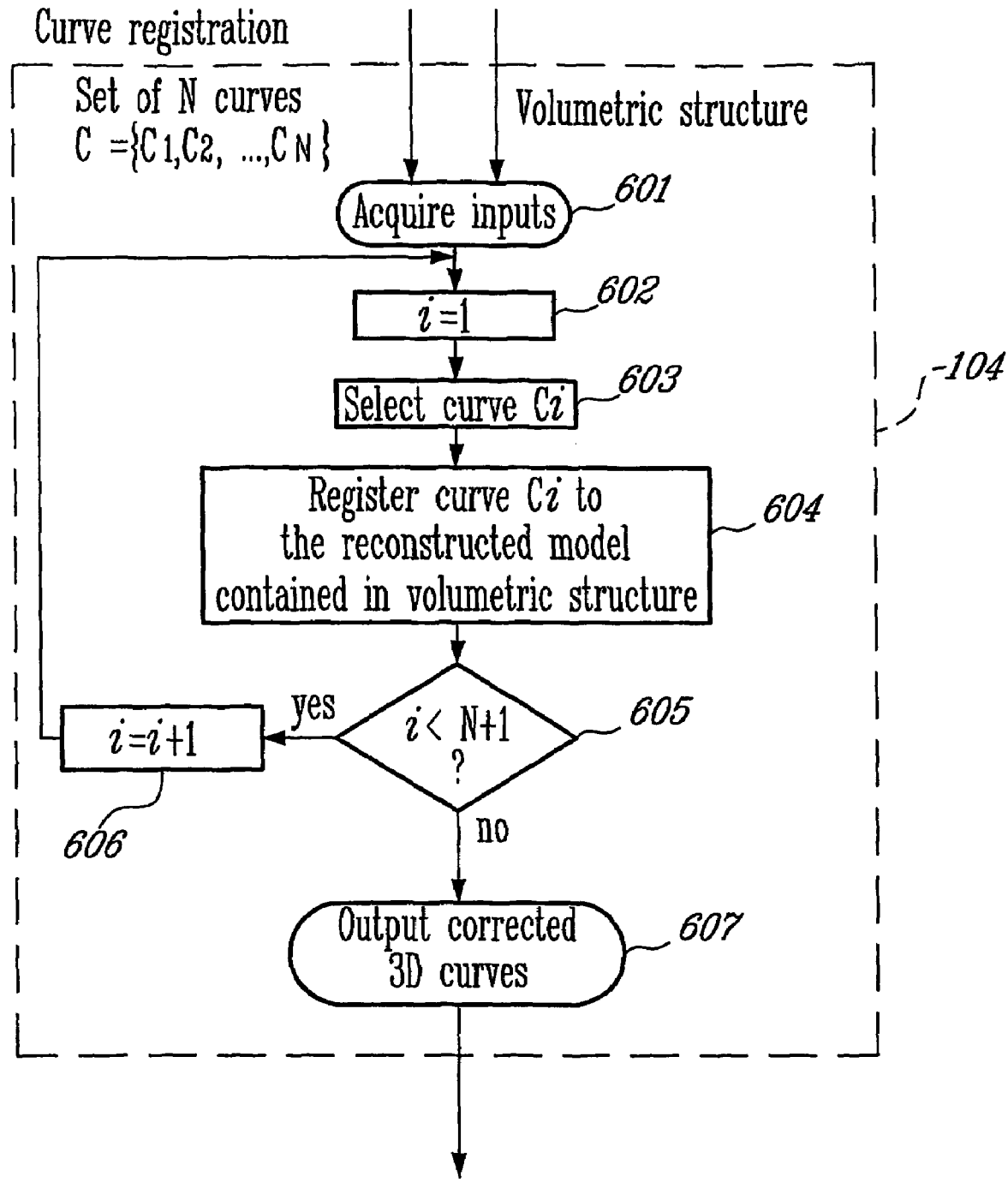
FIG. 7 represents the curve registration step.

Each curve is registered independently 604 to the reconstructed model that is implicitly represented in the volumetric structure. Flowchart in FIG. 7 illustrates the overall procedure.

Registration of a Single Curve

Figure 8:
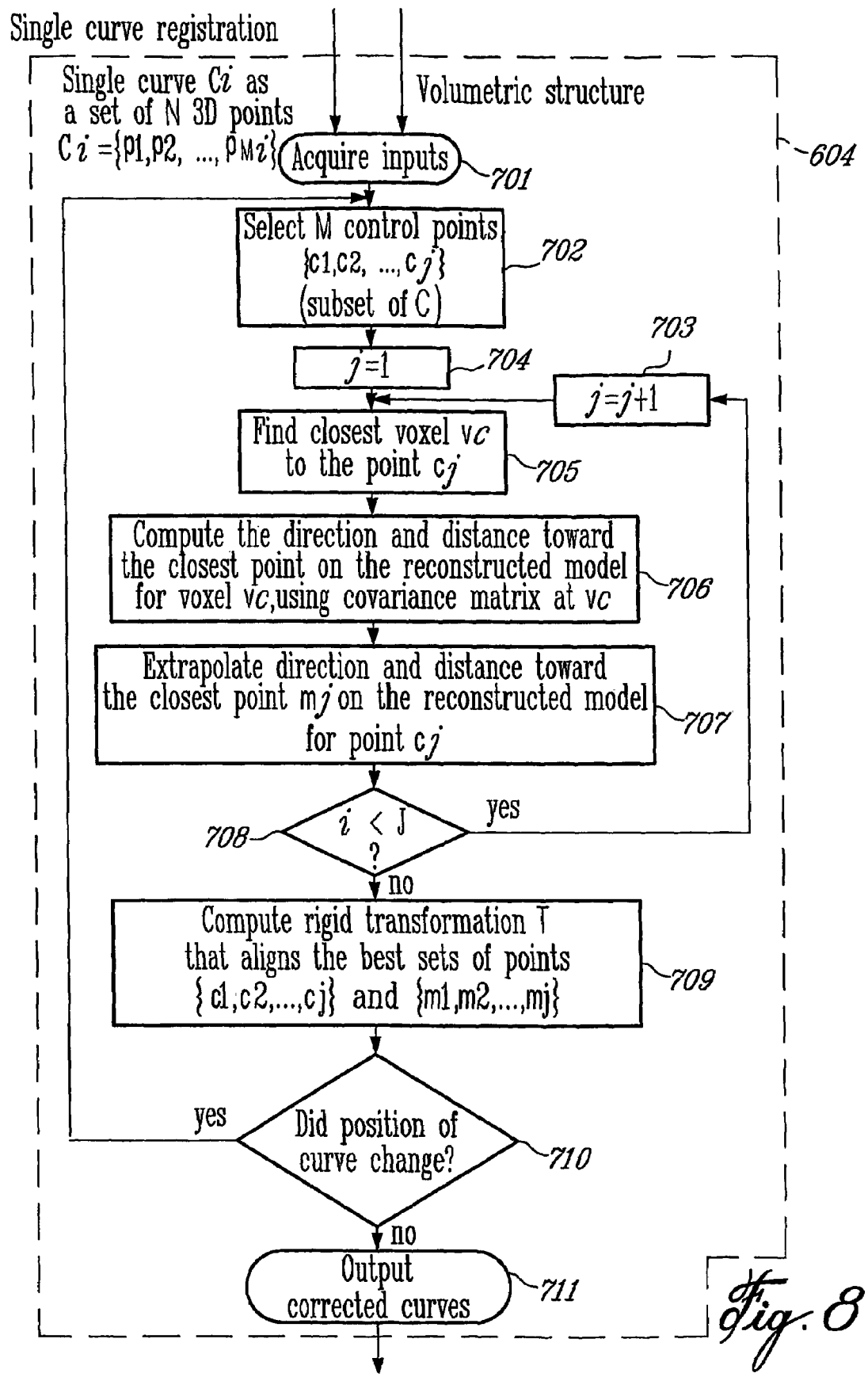
FIG. 8 represents the registration procedure for a single curve.

FIG. 8 shows registration procedure for a single curve $C_i = \{p_1, p_2, \ldots, p_{M_i}\}$. First a subset $W_i$ of points in $C_k$ is chosen 702 as a set of control points $$W_i \subseteq C_i = \{c_1, c_2, \ldots, c_{Qj}\}$$

(The set $W_i$ can be equal to $C_i$)

Figure 9:
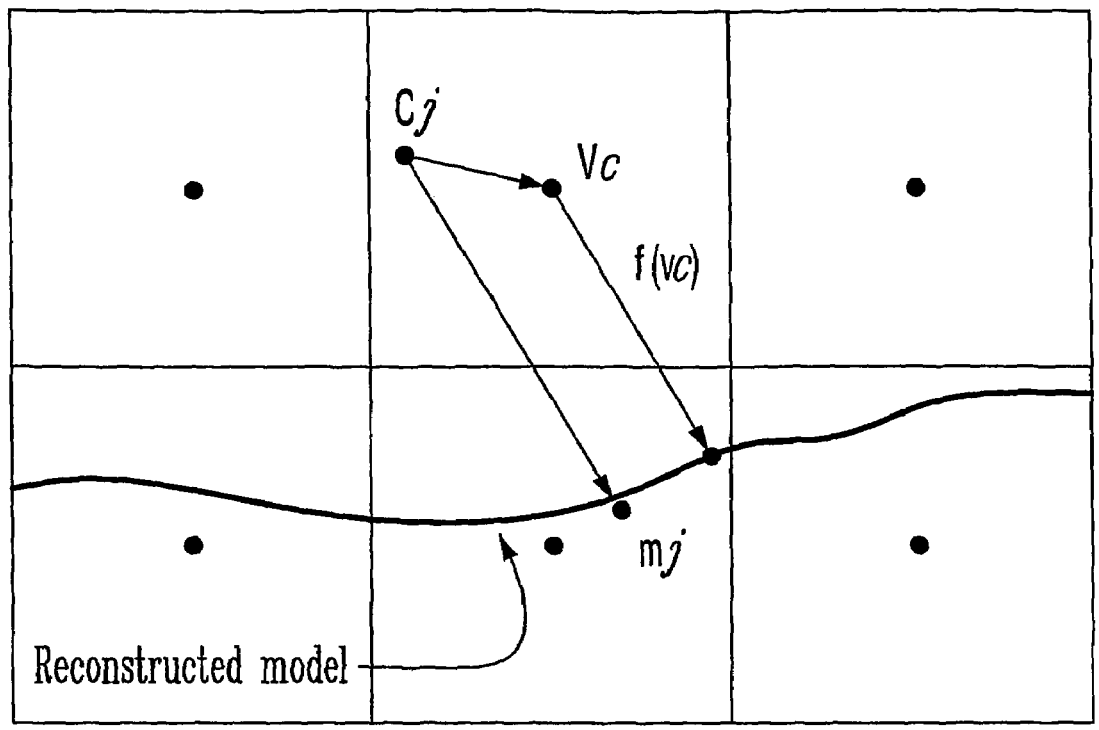
FIG. 9 represents the extrapolation of the matching point $m_j$ for the control point $c_j$ in the registration procedure for a single curve.

The following procedure is repeated for all control points $c_j$. First the closest voxel $v_c$ to the control point $c_j$ is found. Then the direction f from point $c_j$ toward the reconstructed model is computed using the covariance matrix $K_c$ at voxel $v_c$. The direction f is the eigenvector associated with the smallest eigenvalue of matrix $K_c/\omega_c$, where $\omega_c$ is the weighting factor at voxel $v_c$. The distance e to the reconstructed model is obtained as $\langle f, g_c \rangle / \omega_c$. The matching point $m_j$ for the control point $c_j$ is extrapolated as $$m_j = c_j + f[e + \langle f, (v_c - c_j) \rangle]$$

which is illustrated in FIG. 9. The value ef is a vector that indicates the direction and the distance toward the closest point on the reconstructed model from the voxel $v_c$. Once the matching point is obtained for all control points, a rigid transformation $\Phi$ that best aligns two sets of points $\{c_1, c_2, \ldots, c_J\}$ and $\{m_1, m_2, \ldots, m_J\}$ is computed. This is accomplished using standard techniques, for example quaternions. The transformation matrix $\Phi$ is then applied to all curve points:

$$p_l \leftarrow \Phi p_l, \ l = 0, \ldots, M_i.$$

An example of a cost function $\Psi$ that can be used to compute the rigid transformation $\Phi$ is a sum of squared distances between corresponding points, i.e.

$$\Psi = \sum_{k=1}^{J} \|c_i - m_i\|^2$$

The cost function can be modified to exploit surface proprieties to improve the quality of registration. For example, the following cost function utilises color $\Gamma = [R\ G\ B]^T$ associated with each point:

$$\Psi' = \sum_{k=1}^{J} \lambda_k \|c_k - m_k\|^2,$$

where $\lambda_k$ is a weighting factor dependent on similarity of colors:

$$\lambda_k = \begin{cases} 1 & \text{if colors } \Gamma_{ck} \text{ and } \Gamma_{mk} \text{ are similar} \\ 0 & \text{otherwise} \end{cases}.$$

$\Gamma_{ck}$ and $\Gamma_{mk}$ are colors associated with points $c_k$ and $m_k$ respectively.

Prior to computing matching points it has to be verified whether the eigenvalues $\lambda_1 < \lambda_2 < \lambda_3$ of matrix $K_c/\omega_c$ satisfy the following relation $\lambda_2 > 0.05$ and $\lambda_1 < 0.5\lambda_2$. These values are provided as indications. They mean that the local distribution of tangents is nearly planar. If not, both control point $c_j$ and matching point $m_j$ are rejected. When more than a given number of points are rejected (for example 70%) then the whole curve is rejected.

If the average displacement of curve points after the transformation has been applied is larger then a threshold (for example 1% of the grid resolution $\Delta$) the whole procedure is repeated 710.

Surface Extraction

The surface extraction proceeds by converting the implicit surface representation in the volumetric structure into scalar distance field. This is performed by computing the direction $f_j$ and distance e from each voxel $v_j$ toward the reconstructed model if the $\omega > 0$ at voxel $v_j$. The direction f is eigenvector associated with the smallest eigenvalue of matrix $K_j/\omega_j$, where $K_j$ is covariance matrix and $\omega$ is the weighting factor at voxel $v_j$. The distance e to the reconstructed model is obtained as $\langle f_j, g_j \rangle / \omega_j$. Distance e at each voxel represents a scalar field. A Marching Cubes algorithm, for instance, is applied to this scalar field in order to obtain a triangulated surface (represented as a set of triangles).

Alternative Embodiments and Applications

Reconstruction of Additional Surface Properties

Presented method can be used to reconstruct not only model geometry, but also different surface properties including but not limited to color, intensity, texture and temperature.

To allow reconstruction of additional object properties the following modifications are required:

Each curve is assumed to have a surface property assigned to each curve point, i.e. for a curve $C_i = \{p_1, p_2, \ldots, p_{M_i}\}$ a property $h_i$ is assigned to each point $p_i$.

During the initialization step 100 a single or multiple zero valued properties H are attached to each lattice point. Surface properties can be either scalar or vector valued. During the integration of curves 404, property value $H_j$ at voxel $v_j$ is updated as:

$$H_j \leftarrow H_j + \omega_j(h_i + u_c(h_{i+1} - h_i)).$$

During the extraction of the triangulated surface (by Marching Cubes), property value interpolated between two voxels closest to each triangle vertex.

Figure 10:
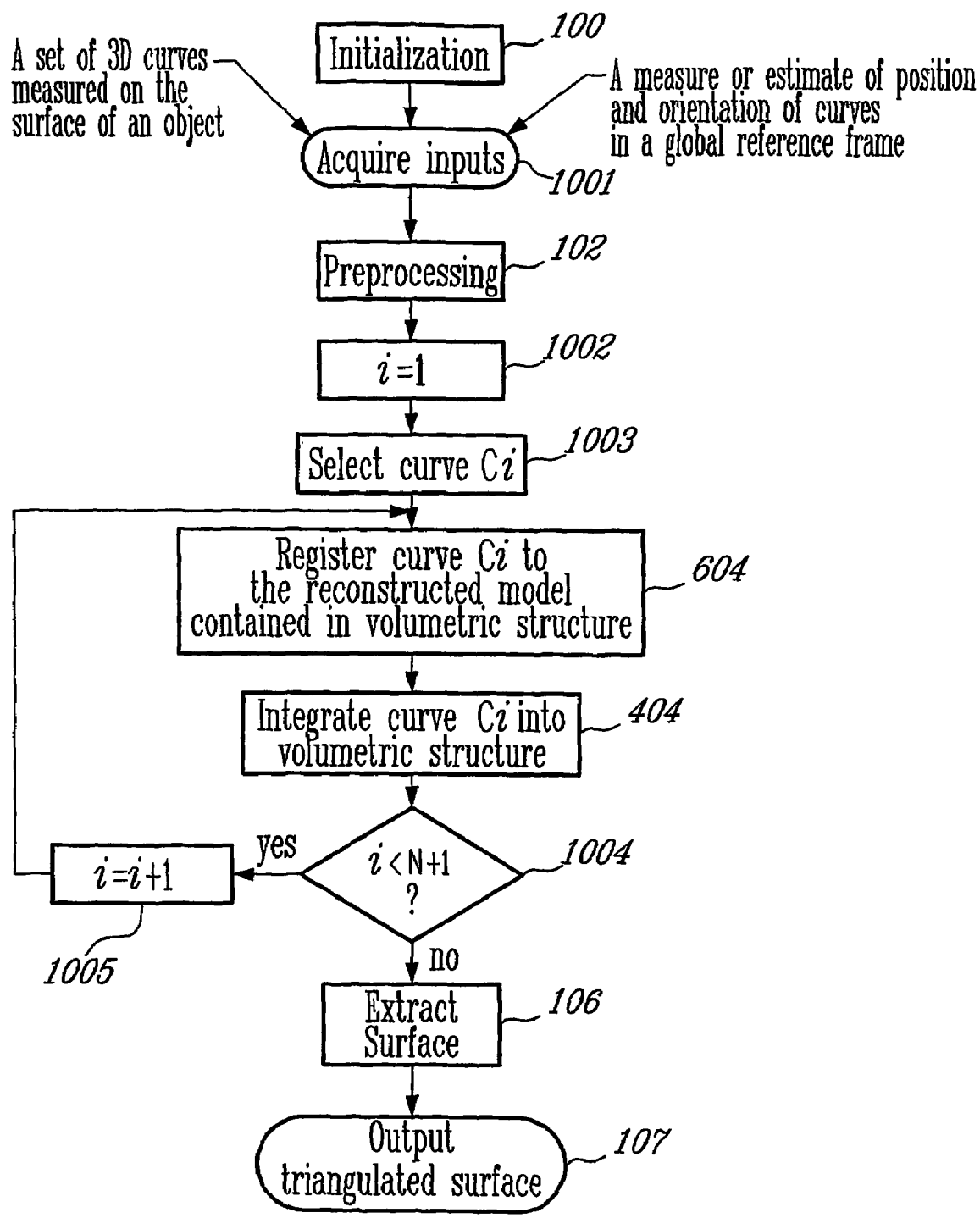
FIG. 10 represents a flowchart where each curve is registered prior to its integration to the volumetric structure.

Alternative configuration: Incremental registration The two basic building blocks of the method, curve integration 404 and curve registration 604 can be rearranged into a different configuration to accomplish incremental registration where each curve is registered prior to its integration. The flowchart in FIG. 10 illustrates the principle of functioning. All building blocks remain the same as for the configuration in FIG. 1.

Modeling from Different Surface Entities

The method presented above accepts as input a set of non-parallel 3D curves which generates organized set of three-dimensional points. However, the same method can be used to build and update the volumetric structure from various arbitrary three-dimensional entities such as partial surfaces (range images), parallel curves, unorganized clouds of points or any combination of these. Moreover, the three-dimensional points can be measured in a single plane and the coordinate system can be reduced to a two-dimensional system. Required modification for each one of these cases is discussed below.

Modeling from Partial Surfaces (Range Images)

Range images are matrices of points measured on the surface of an object in such a way as to allow an approximation of the real surface by a set of connected triangles. Such a surface S is defined as a set of O triangles $S=\{\Lambda_1, \Lambda_2, \ldots, \Lambda_O\}$, where each triangle $\Lambda_i$ is defined by three vertices $p_{i1}$, $P_{i2}$ and $p_{i3}$. It is also assumed that a normal $n_{ij}$ is estimated at each vertex, which can be easily accomplished using standard techniques. The surface is integrated into the volumetric structure one triangle at the time. As for the line segments, a bounding box is estimated for the triangle and for each voxel $v_j$ within bounding box the closest point $p_c$ on the triangle is found. The elements attached at the voxel are then updated as follows:

$$K_j \leftarrow K_j + t_1 t_2^T$$

Vector $g_j$ is updated as:

$$g_j \leftarrow g_j + e^{-\frac{d^2}{0.5\Delta}} (v_j - p_c)$$

Weighting value $\omega_j$ is updated as.

$$\omega_j \leftarrow \omega_j + e^{-\frac{d^2}{0.5\Delta}}$$

where $d=\|v_j - P_c\|$, and $t_1$ and $t_2$ are two vectors, perpendicular to each other as well as to the normal at $p_c$.

Surface is registered to the reconstructed model by choosing a subset of (or all) vertices of the input surface.

Modeling from Parallel Curves

In order to allow the reconstruction from parallel curves, the elements attached at each voxel $v_j$ are updated as follows:

$$K_j \leftarrow K_j + t_1 t_2^T + (v_j - p_c)(v_j - p_c)^T$$

Vector $g_j$ is updated as:

$$g_j \leftarrow g_j + e^{-\frac{d^2}{0.5\Delta}} (v_j - p_c)$$

Weighting value $\omega_j$ is updated as:

$$\omega_j \leftarrow \omega_j + e^{-\frac{d^2}{0.5\Delta}}.$$

Prior to the registration, or surface extraction the covariance matrix $K_c$ is changed to $$K_c \leftarrow K_c - g_j g_j^T$$

Modeling for Unorganized Sets of Points

An unorganized P set of points is simply a set of 3D Points $P=\{p_1, p_2, \ldots, p_{M_i}\}$. Model reconstruction is performed one point at a time. For a point $p_i$, a set of voxels contained in the sphere centered at $p_i$ is found first. Radius of sphere is $\epsilon$. Then the elements attached at each voxel $v_j$ are updated as follows:

$$K_j \leftarrow K_j + (v_j - p_i)(v_j - p_i)^T$$

Vector $g_j$ is updated as:

$$g_j \leftarrow g_j + e^{-\frac{d^2}{0.5\Delta}} (v_j - p_i)$$

Weighting value $\omega_j$ is updated as.

$$\omega_j \leftarrow \omega_j + e^{-\frac{d^2}{0.5\Delta}}$$

where $d=\|v_j - p_i\|$.

Figure 11:
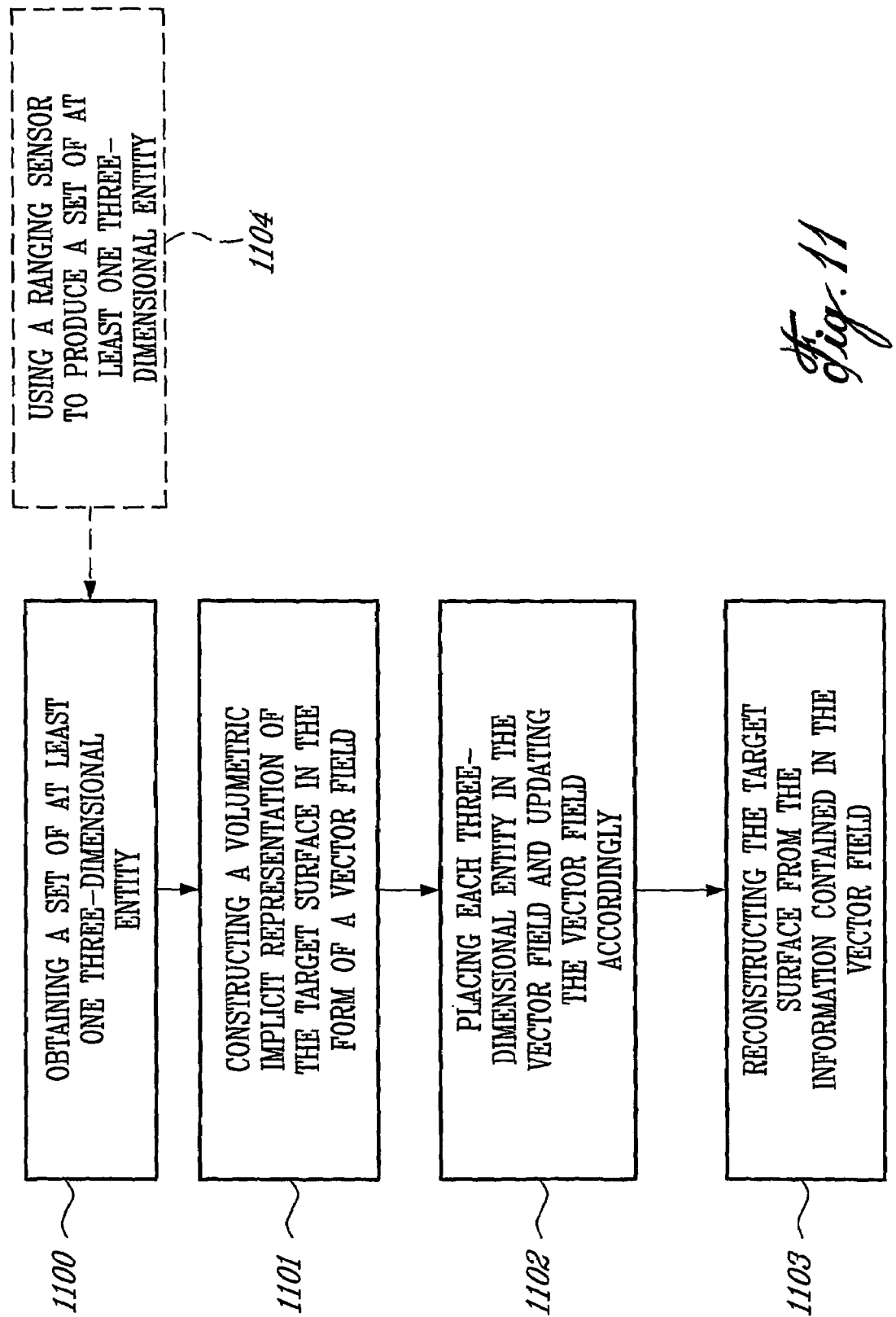
FIG. 11 represents a flowchart of the main steps of one embodiment of the invention.

As shown in FIG. 11, one embodiment of the preferred invention, namely a method for reconstructing surfaces from a single or a plurality of arbitrary three-dimensional entities obtained from a target surface, comprises the following steps: obtaining a set of at least one three-dimensional entity 1100, each entity being a set of three-dimensional points, each three-dimensional point containing at least the three-dimensional coordinates of the point on the target surface; constructing a volumetric implicit representation of the target surface in the form of a vector field 1101, each vector in the vector field containing at least the distance to the reconstructed surface and the direction toward the reconstructed surface; placing each three-dimensional entity in the vector field and updating the vector field accordingly 1102; and reconstructing the target surface from the information contained in the vector field 1103.

In a method for ascertaining the three-dimensional shape of a target surface, an additional step of using a ranging sensor to produce a set of three-dimensional entities 1104 is carried out.

Figure 12:
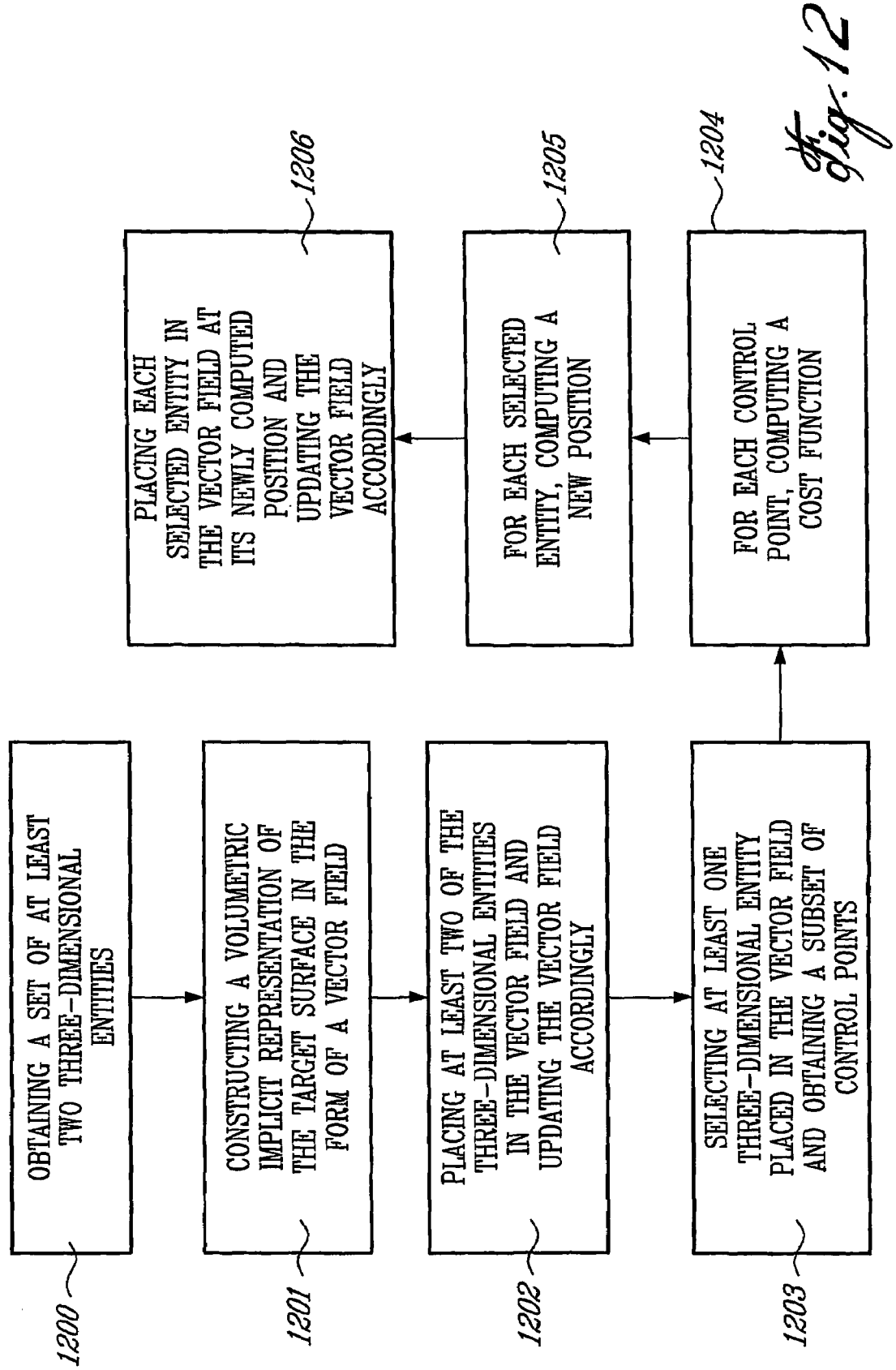
FIG. 12 represents a flowchart of the main steps of a second embodiment of the invention.

As shown in FIG. 12, another embodiment of the preferred invention, namely a method for refining the alignment of arbitrary three-dimensional entities obtained from a target surface, comprises the following steps: obtaining a set of at least two three-dimensional entities 1200, each entity being a set of three-dimensional points, each three-dimensional point containing at least the three-dimensional coordinate of the point on the target surface; constructing a volumetric implicit representation of the target surface in the form of a vector field 1201, each vector in the vector field containing at least the distance to the reconstructed surface and the direction toward the reconstructed surface; placing at least two three-dimensional entities in the vector field and updating the vector field accordingly 1202; selecting at least one three-dimensional entity placed in the vector field and obtaining a subset of three-dimensional points on each of the selected three-dimensional entities, three-dimensional points in these subsets being called control points 1203; for each control point in each selected three-dimensional entity, computing a contribution to a cost function 1204, the contribution being a function of at least the vector field and the three-dimensional coordinate of the control point; for each selected three-dimensional entity, computing a new position 1205 that optimizes its corresponding cost function; and placing each selected three-dimensional entity in the vector field at its newly computed position and updating the vector field accordingly 1206.

Figure 13:
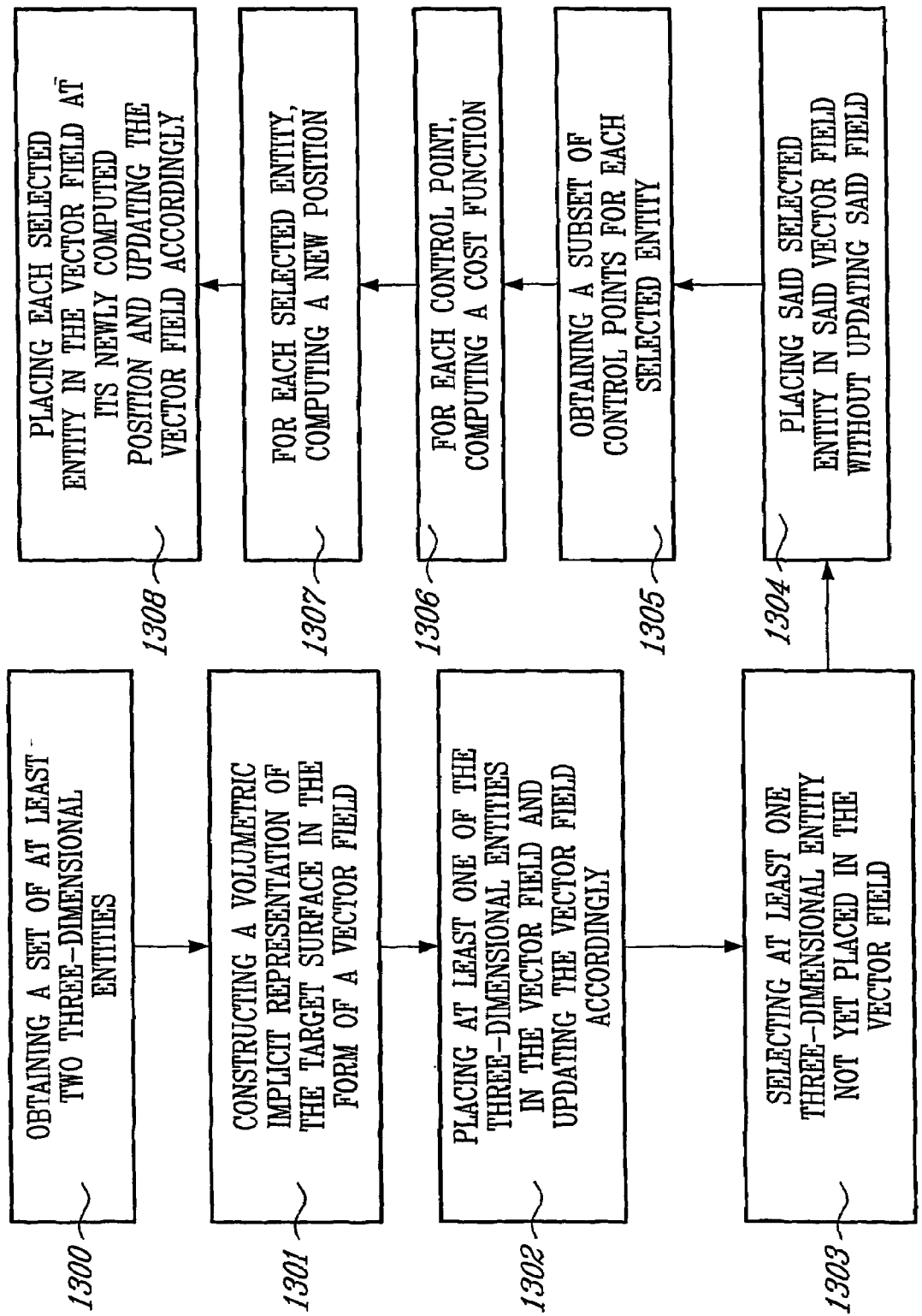
FIG. 13 represents a flowchart of the main steps of a third embodiment of the invention.

As shown in FIG. 13, another embodiment of the preferred invention, namely a method for refining the alignment of arbitrary three-dimensional entities obtained from a target surface, comprises the following steps: obtaining a set of at least two three-dimensional entities 1300, each entity being a set of three-dimensional points, each three-dimensional point containing at least the three-dimensional coordinate of the point on the target surface; constructing a volumetric implicit representation of the target surface in the form of a vector field 1301, each vector in the vector field containing at least the distance to the reconstructed surface and the direction toward the reconstructed surface; placing at least one three-dimensional entity in the vector field and updating the vector field accordingly 1302; selecting at least one of the three-dimensional entities not yet placed in the vector field 1303, placing the selected three-dimensional entities in the vector field without updating the field 1304 and obtaining a subset of three-dimensional points on each of the selected three-dimensional entities, three-dimensional points in these subsets being called control points 1305; for each control point in each selected three-dimensional entity, computing a contribution to a cost function 1306, the contribution being a function of at least the vector field and the three-dimensional coordinate of the control point; for each selected three-dimensional entity, computing a new position 1307 that optimizes its corresponding cost function; and placing each selected three-dimensional entity in the vector field at its newly computed position and updating the vector field accordingly 1308.

Figure 14:
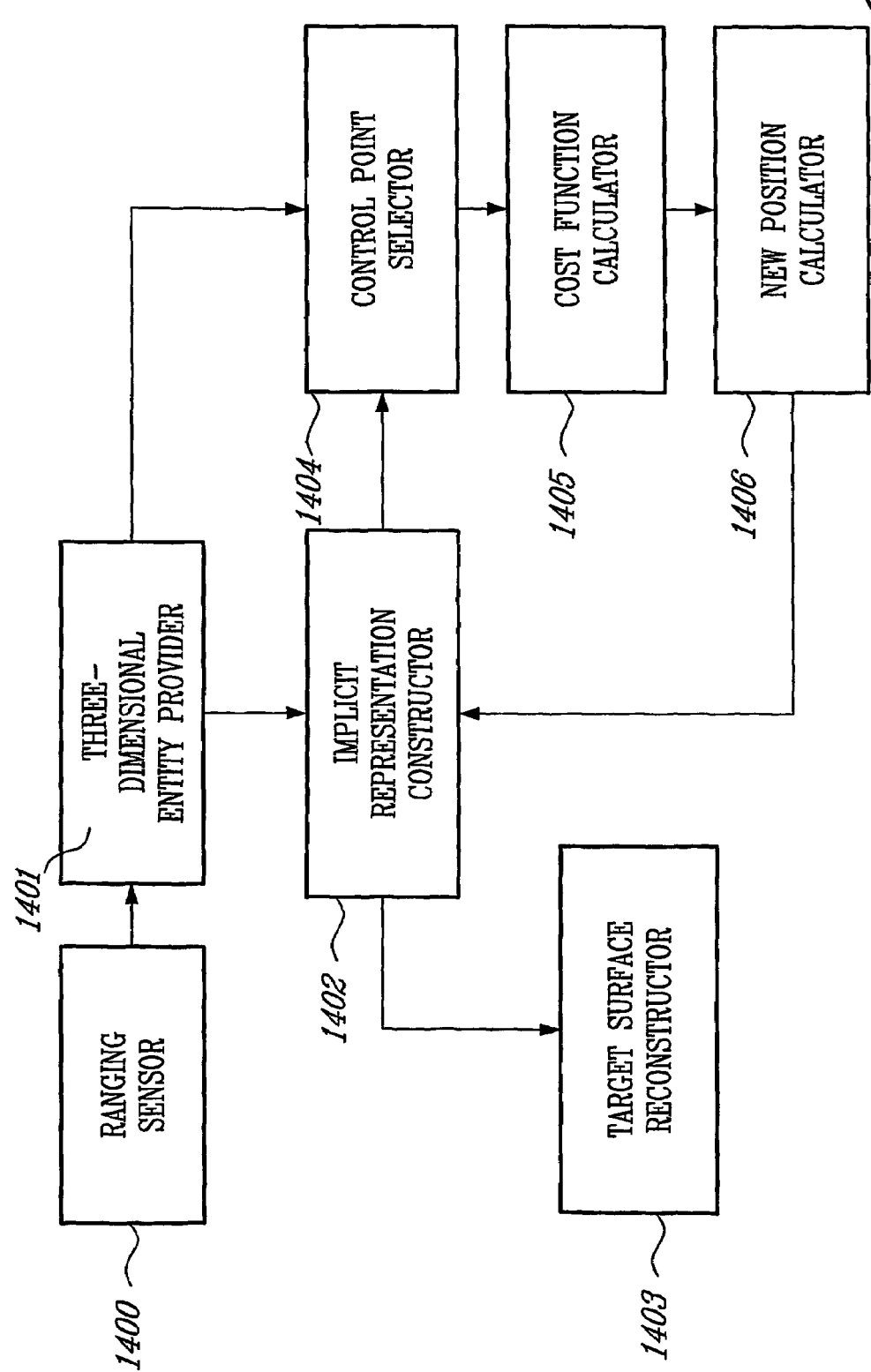
FIG. 14 represents a block diagram of the main components of the present invention.

As shown in FIG. 14, a preferred embodiment of the system for reconstructing surfaces from a single or a plurality of arbitrary three-dimensional entities obtained from a target surface comprises the following main components: a three-dimensional entity provider 1401 for obtaining a set of at least one three-dimensional entity, each entity being a set of three-dimensional points, each three-dimensional point containing at least the three-dimensional coordinates of the point on the target surface; an implicit representation constructor 1402 for constructing a volumetric implicit representation of the target surface in the form of a vector field, each vector in the vector field containing at least the distance to the reconstructed surface and the direction toward the reconstructed surface; for placing each three-dimensional entity in the vector field and for updating the vector field accordingly; and a target surface reconstructor 1403 for reconstructing the target surface from the information contained in the vector field. Preferably, if the system is used to ascertain the three-dimensional shape of a target surface, a ranging sensor 1400 is used to produce the set of three-dimensional entities.

If the system is used to refine the alignment of arbitrary three-dimensional entities obtained from a target surface, the following components are provided: a control point selector 1404 for selecting at least one three-dimensional entity placed in the vector field and obtaining a subset of three-dimensional points on each of the selected three-dimensional entities, three-dimensional points in these subsets being called control points; a cost function calculator 1405 for computing, for each control point in each selected three-dimensional entity, a contribution to a cost function, the contribution being a function of at least the vector field and the three-dimensional coordinate of the control point; for each selected three-dimensional entity, a new position calculator 1406 for computing a new position that optimizes its corresponding cost function. The implicit representation constructor 1402 is then used to place each selected three-dimensional entity in the vector field at its newly computed position and updating the vector field accordingly.

If the system is used to refine the alignment of arbitrary three-dimensional entities obtained from a target surface, the following components are provided: a control point selector 1404 for selecting at least one of the three-dimensional entities not yet placed in the vector field, using the implicit representation constructor 1402 to place the selected three-dimensional entities in the vector field without updating the field and obtaining a subset of three-dimensional points on each of the selected three-dimensional entities, three-dimensional points in these subsets being called control points; a cost function calculator 1405 for computing, for each control point in each selected three-dimensional entity, a contribution to a cost function, the contribution being a function of at least the vector field and the three-dimensional coordinate of the control point; a new position calculator 1406 for computing, for each selected three-dimensional entity, a new position that optimizes its corresponding cost function; and using the implicit representation constructor 1402 to place each selected three-dimensional entity in the vector field at its newly computed position and updating the vector field accordingly.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

The invention claimed is:

1. A method for reconstructing a surface from at least one arbitrary three-dimensional entity obtained from a target surface, comprising:
obtaining a set of at least one three-dimensional entity and a position for said at least one entity in a common three-dimensional coordinate system, each entity being a set of three-dimensional points, each said point containing at least the three-dimensional coordinates of said point on said target surface, wherein said entity is one of an unorganized cloud, a three-dimensional curve and a range image;

constructing a volumetric implicit representation of said target surface in the form of a vector field using said set, each vector in said vector field containing at least the distance to said target surface and the direction toward said target surface;

reconstructing said target surface from the information contained in said vector field.

2. The method as claimed in claim 1, wherein said set of at least one entity includes at least one entity being one of said unorganized cloud and said curve.

3. The method as claimed in claim 1, wherein a subset of said points contains surface properties measured on said target surface.

4. The method as claimed in 3, wherein at least one of said surface properties measured on said target surface is a grayscale value associated to said point.

5. The method as claimed in claim 3, wherein at least one of said surface properties measured on said target surface is a color information associated to said point.

6. The method as claimed in claim 3, wherein at least one of said surface properties measured on said target surface is an information describing the surface texture associated to said point.

7. The method as claimed in claim 1, further comprising: using a ranging sensor to produce said set of entities.

8. The method as claimed in claim 7, wherein said ranging sensor is held in hand by an operator.

9. The method as claimed in claim 7, wherein said ranging sensor is moved by a mechanical device.

10. The method as claimed in claim 1, wherein said three-dimensional points are all measured in a single plane and the three-dimensional coordinate system can be reduced to a two-dimensional coordinate system.

11. A method for refining an alignment of arbitrary three-dimensional entities obtained from a target surface, comprising:

(a) obtaining a set of at least two three-dimensional entities and a position for said at least two entities in a common three dimensional coordinate system, each entity being a set of three-dimensional points, each said point containing at least the three-dimensional coordinates of said point on said target surface, wherein each said entity is one of an unorganized cloud, a three-dimensional curve and a range image;

(b) constructing a volumetric implicit representation of said target surface in the form of a vector field using a subset of at least one entity of said set, each vector in said vector field containing at least the distance to said target surface and the direction toward said target surface;

(c) selecting at least one obtained entity;

(d) obtaining a subset of said points on each of said selected entities, points in these subsets being called control points;

(e) for each control point in each selected entity, computing a contribution to a cost function, said contribution being a function of at least said vector field and said coordinate of said control point;

(f) for each selected entity, computing a new position that optimizes its corresponding cost function; and (g) placing each selected entity in said vector field at its newly computed position and updating said vector field accordingly.

12. The method as claimed in claim 11, wherein said set of at least two entities includes at least one entity being one of said unorganized cloud and said curve.

13. The method as claimed in claim 11 wherein steps (c), (d), (e), (f) and (g) are repeated until a set of convergence criteria is met.

14. The method as claimed in claim 11, wherein said step (b) comprises placing at least one entity in said vector field and updating said vector field accordingly; and wherein said step (c) comprises selecting at least one of said entities not yet placed in said vector field and placing said selected entities in said vector field without updating said field.

15. The method as claimed in claim 11 wherein a subset of said points contains surface properties measured on said target surface.

16. The method as claimed in claim 15, wherein said cost function is a function of said surface properties measured on said target surface.

17. A system for reconstructing a surface from at least one arbitrary three-dimensional entity obtained from a target surface comprising:

a three-dimensional entity provider for obtaining a set of at least one three-dimensional entity and a position for said at least one entity in a common three-dimensional coordinate system, each entity being a set of three-dimensional points, each point containing at least the three-dimensional coordinates of said point on said target surface, wherein said entity is one of an unorganized cloud, a three-dimensional curve and a range image;

an implicit representation constructor for constructing a volumetric implicit representation of said target surface in the form of a vector field using said set, each vector in said vector field containing at least the distance to said target surface and the direction toward said target surface; and a target surface reconstructor for reconstructing said target surface from the information contained in said vector field.

18. The system as claimed in claim 17, wherein said set of at least one entity includes at least one entity being one of said unorganized cloud and said curve.

19. A system for refining an alignment of arbitrary three-dimensional entities obtained from a target surface, comprising:

a three-dimensional entity provider for obtaining a set of at least two three-dimensional entities and a position for said at least two entities in a common three-dimensional coordinate system, each entity being a set of three-dimensional points, each point containing at least the three-dimensional coordinates of said point on said target surface, wherein each said entity is one of an unorganized cloud, a three-dimensional curve and a range image;

an implicit representation constructor for constructing a volumetric implicit representation of said target surface in the form of a vector field using said set, each vector in said vector field containing at least the distance to said target surface and the direction toward said target surface; and a control point selector for selecting at least one entity used in said vector field;

a subset provider for obtaining a subset of points on each of said selected entities, points in these subsets being called control points;

a cost function calculator for computing, for each control point in each selected entity, a contribution to a cost function, the contribution being a function of at least the vector field and the coordinate of the control point;

a new position calculator for computing, for each selected entity, a new position that optimizes its corresponding cost function;

wherein the implicit representation constructor places each selected entity in the vector field at its newly computed position and updates the vector field accordingly.

20. The system as claimed in claim 19, wherein said set of at least two entities includes at least one entity being one of said unorganized cloud and said curve.

* * * * *